United States Patent
Suzuki et al.

(10) Patent No.: US 12,019,914 B2
(45) Date of Patent: Jun. 25, 2024

(54) DATA PROCESSING DEVICE

(71) Applicant: Kioxia Corporation, Tokyo (JP)

(72) Inventors: Tomoya Suzuki, Tokyo (JP); Kazuhiro Hiwada, Kamakura (JP)

(73) Assignee: Kioxia Corporation, Tokyo (JP)

( * ) Notice: Subject to any disclaimer, the term of this patent is extended or adjusted under 35 U.S.C. 154(b) by 59 days.

(21) Appl. No.: 17/643,953

(22) Filed: Dec. 13, 2021

(65) Prior Publication Data

US 2022/0291869 A1  Sep. 15, 2022

(30) Foreign Application Priority Data

Mar. 12, 2021 (JP) ................................. 2021-040173
Sep. 15, 2021 (JP) ................................. 2021-150443

(51) Int. Cl.
*G06F 3/06* (2006.01)
*G06F 12/10* (2016.01)

(52) U.S. Cl.
CPC .......... *G06F 3/0659* (2013.01); *G06F 3/061* (2013.01); *G06F 3/0688* (2013.01); *G06F 12/10* (2013.01)

(58) Field of Classification Search
CPC .. G06F 12/0238; G06F 12/0284; G06F 12/10; G06F 2212/1024; G06F 2212/7208; G06F 3/061; G06F 3/0659; G06F 3/0679; G06F 3/0688
See application file for complete search history.

(56) References Cited

U.S. PATENT DOCUMENTS

| 2018/0357018 A1 | 12/2018 | Karr et al. | |
| 2019/0278486 A1 | 9/2019 | Naruko et al. | |
| 2020/0097420 A1* | 3/2020 | Choi | G06F 3/0604 |
| 2020/0293198 A1* | 9/2020 | Anazawa | G06F 3/0688 |

FOREIGN PATENT DOCUMENTS

JP  2018-41162 A  3/2018

OTHER PUBLICATIONS

Gu et al. "Biscuit: A Framework for Near-Data Processing of Big Data Workloads", 2016 ACM/IEEE 43$^{rd}$ Annual International Symposium on Computer Architecture, 2016, 13 pages.
Hsieh et al., "Accelerating Pointer Chasing in 3D-Stacked Memory: Challenges, Mechanisms, Evaluation", International Conference on Computer Design (ICCD), Oct. 2016, 8 pages.

* cited by examiner

*Primary Examiner* — Yong J Choe
(74) *Attorney, Agent, or Firm* — Oblon, McClelland, Maier & Neustadt, L.L.P.

(57) ABSTRACT

According to one embodiment, a data processing device includes: a first memory system including a first nonvolatile memory; a second memory system including a second nonvolatile memory; and a host device configured to control the first memory system and the second memory system. The first memory system further includes: a first circuit configured to cause the first nonvolatile memory to perform a read operation of first data based on a first request received from the host device; a second circuit capable of calculating a first access information corresponding to the second memory system based on the first data; and a third circuit configured to generate a second request to cause the second memory system to perform a read operation of second data based on the first access information.

18 Claims, 19 Drawing Sheets

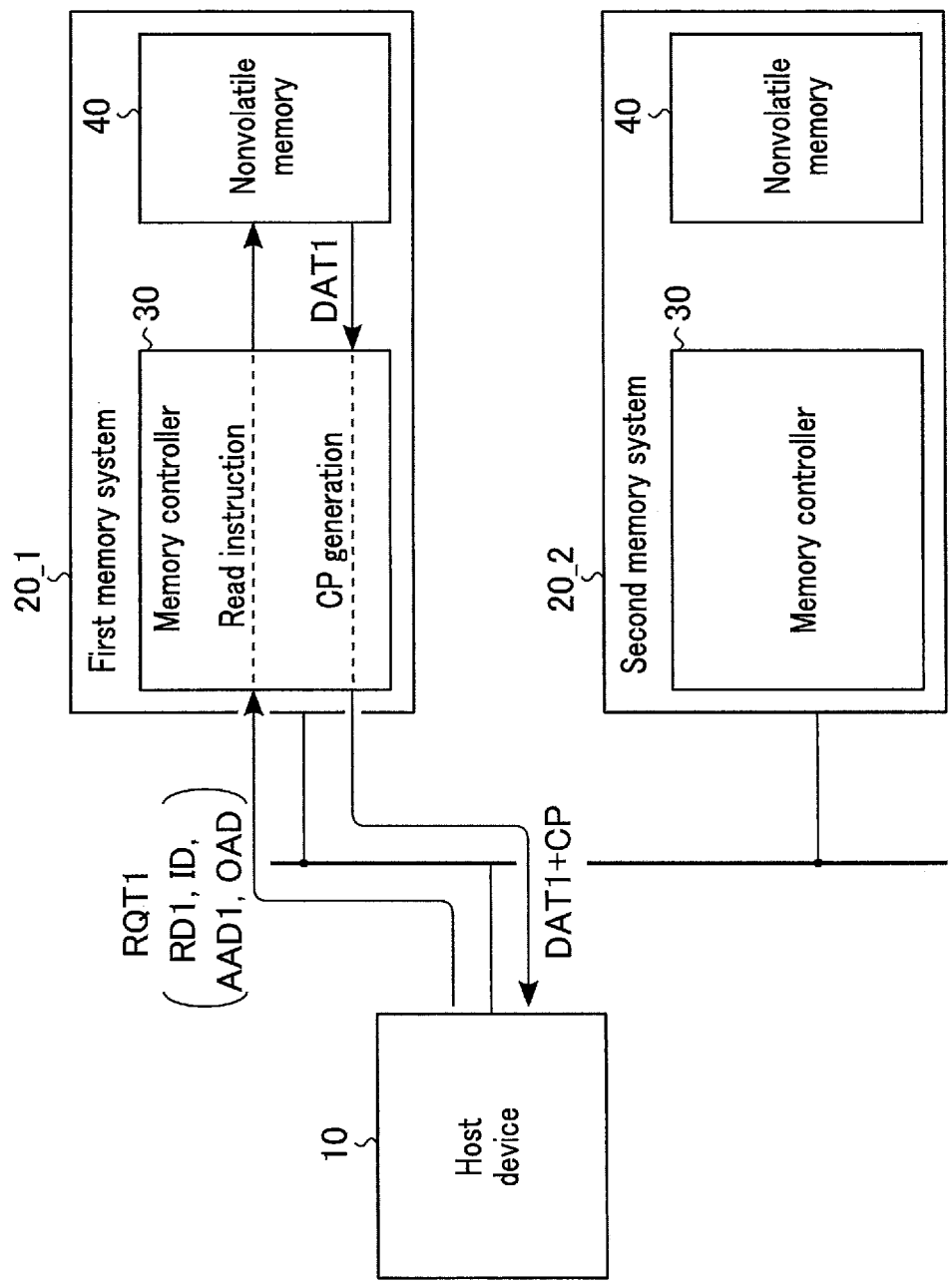
F I G. 2

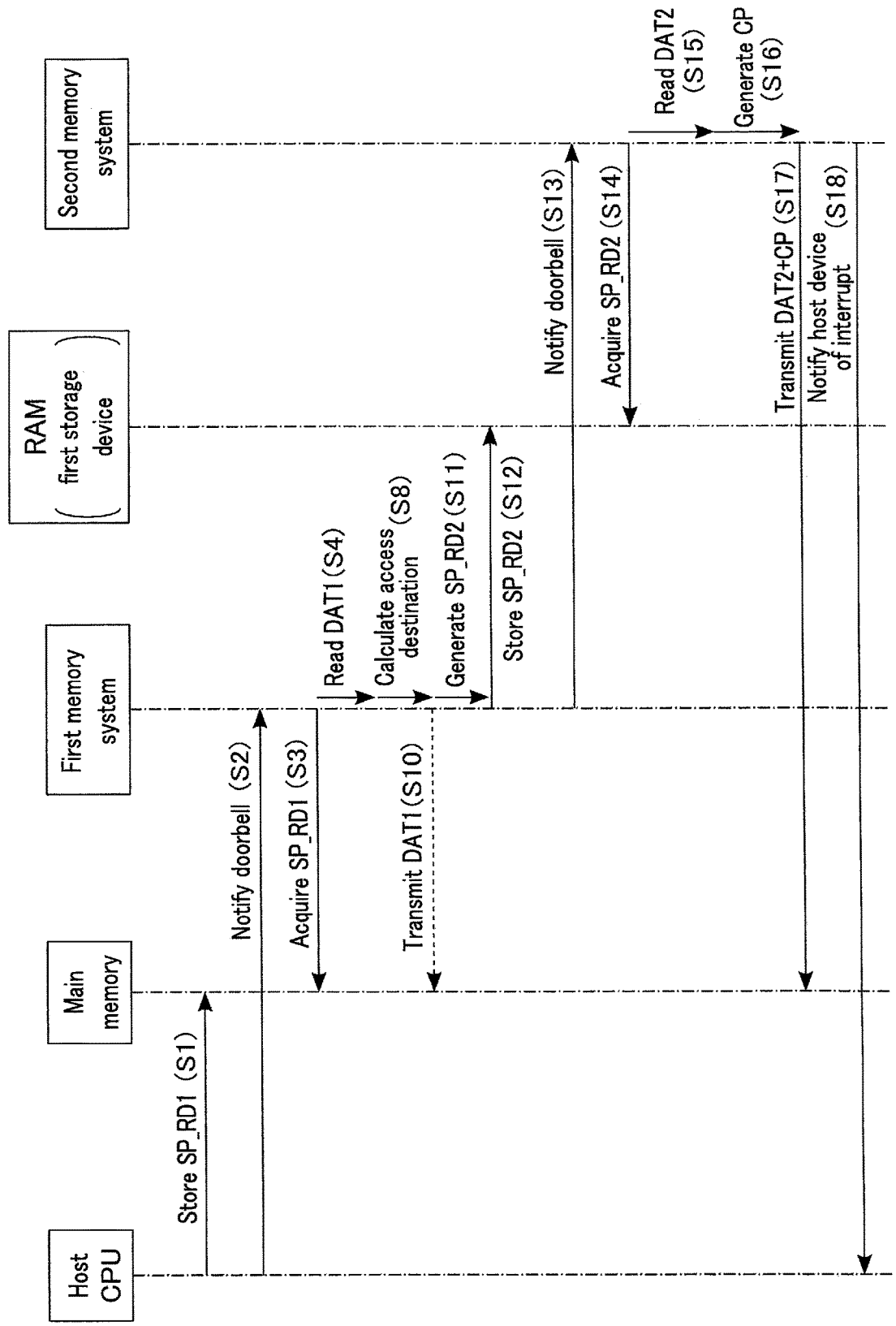
F I G. 6

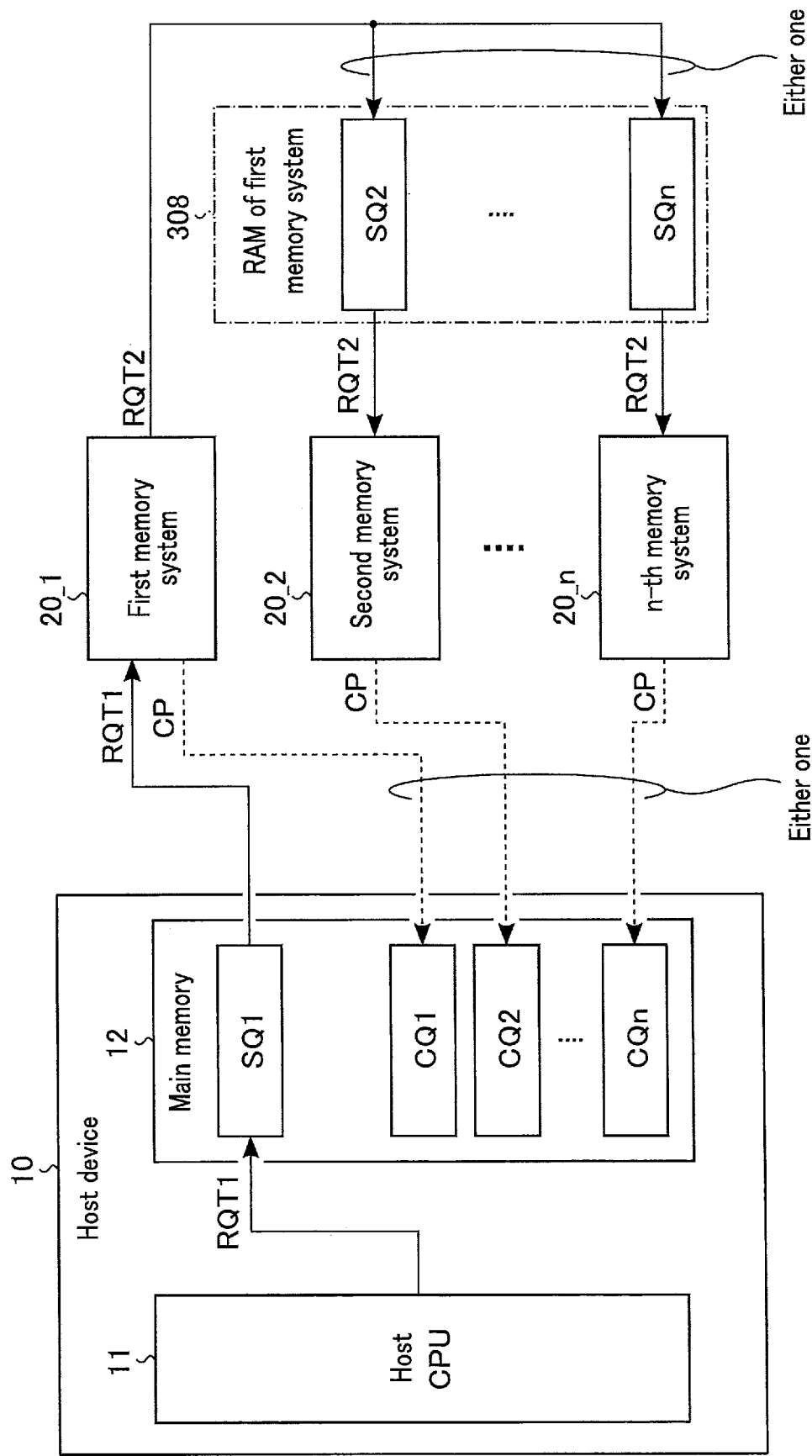
F I G. 7

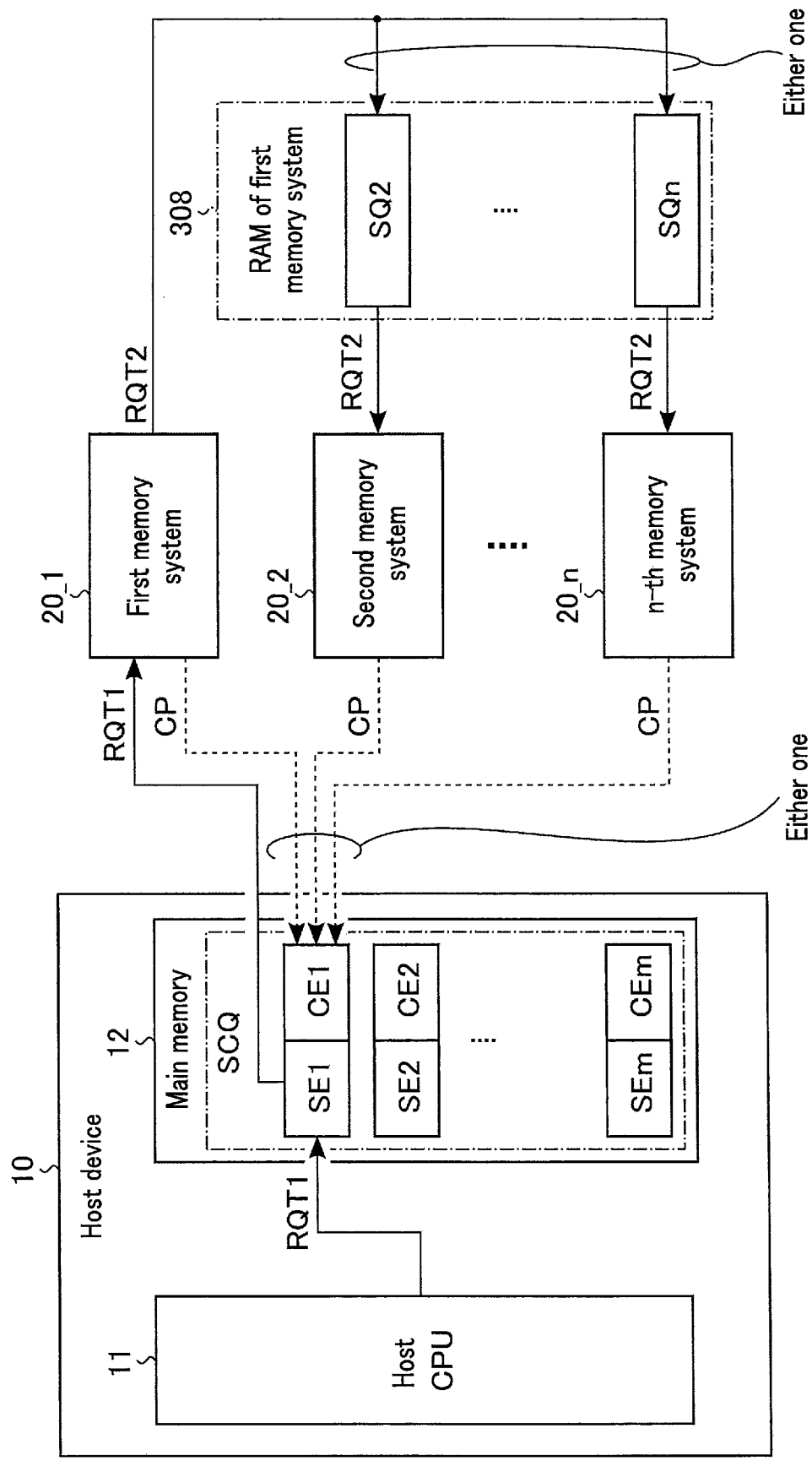
F I G. 8

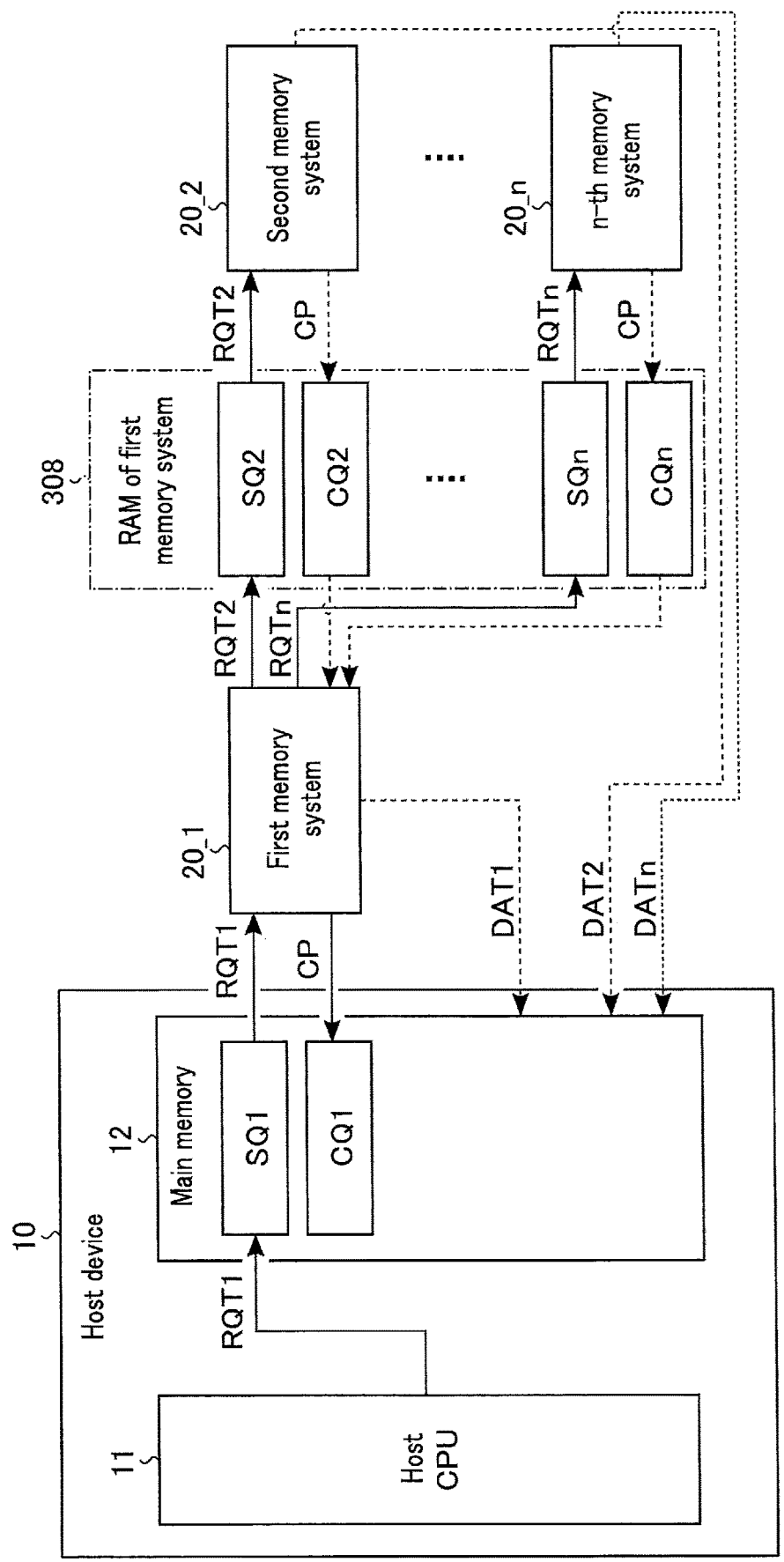
F I G. 9

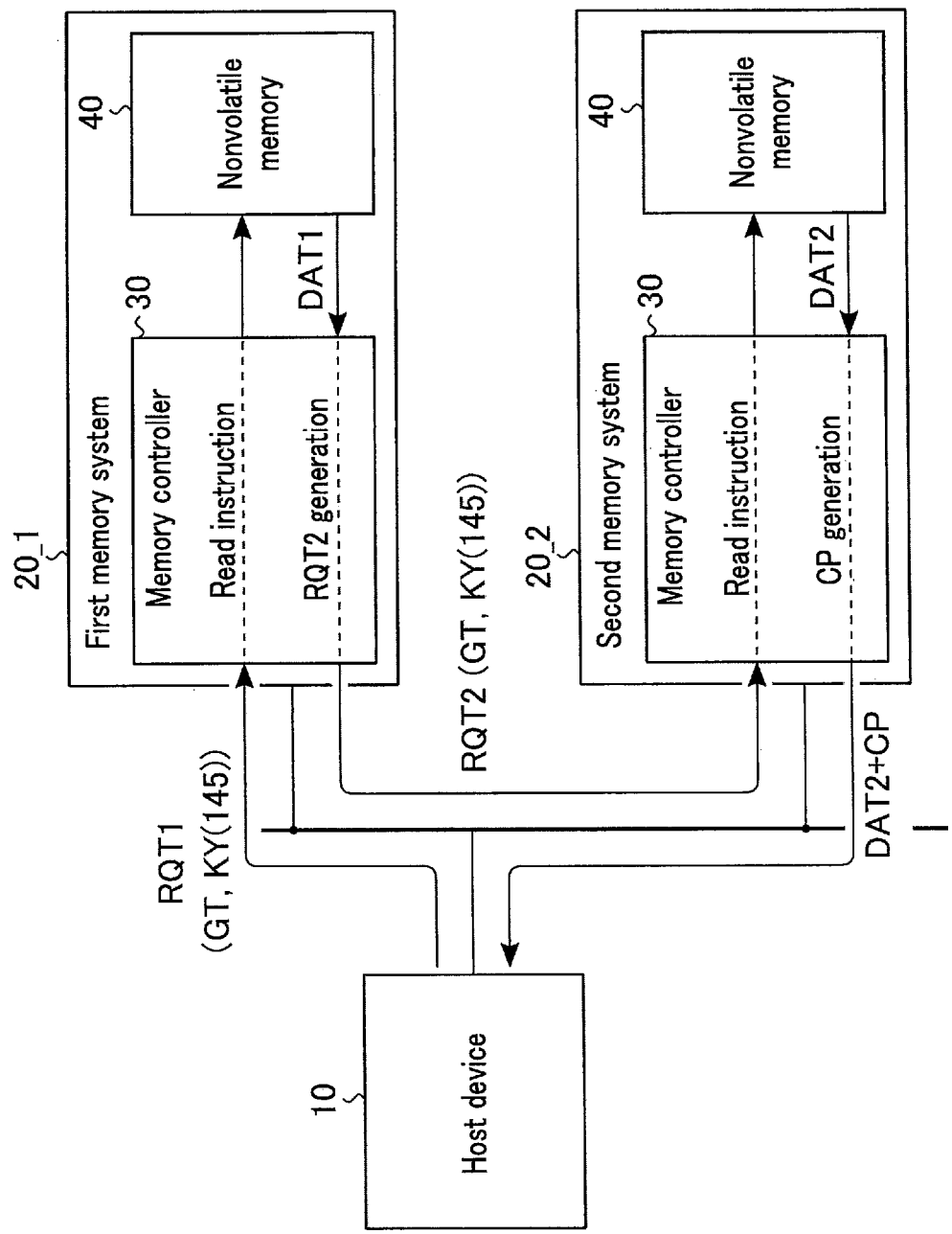
F I G. 12

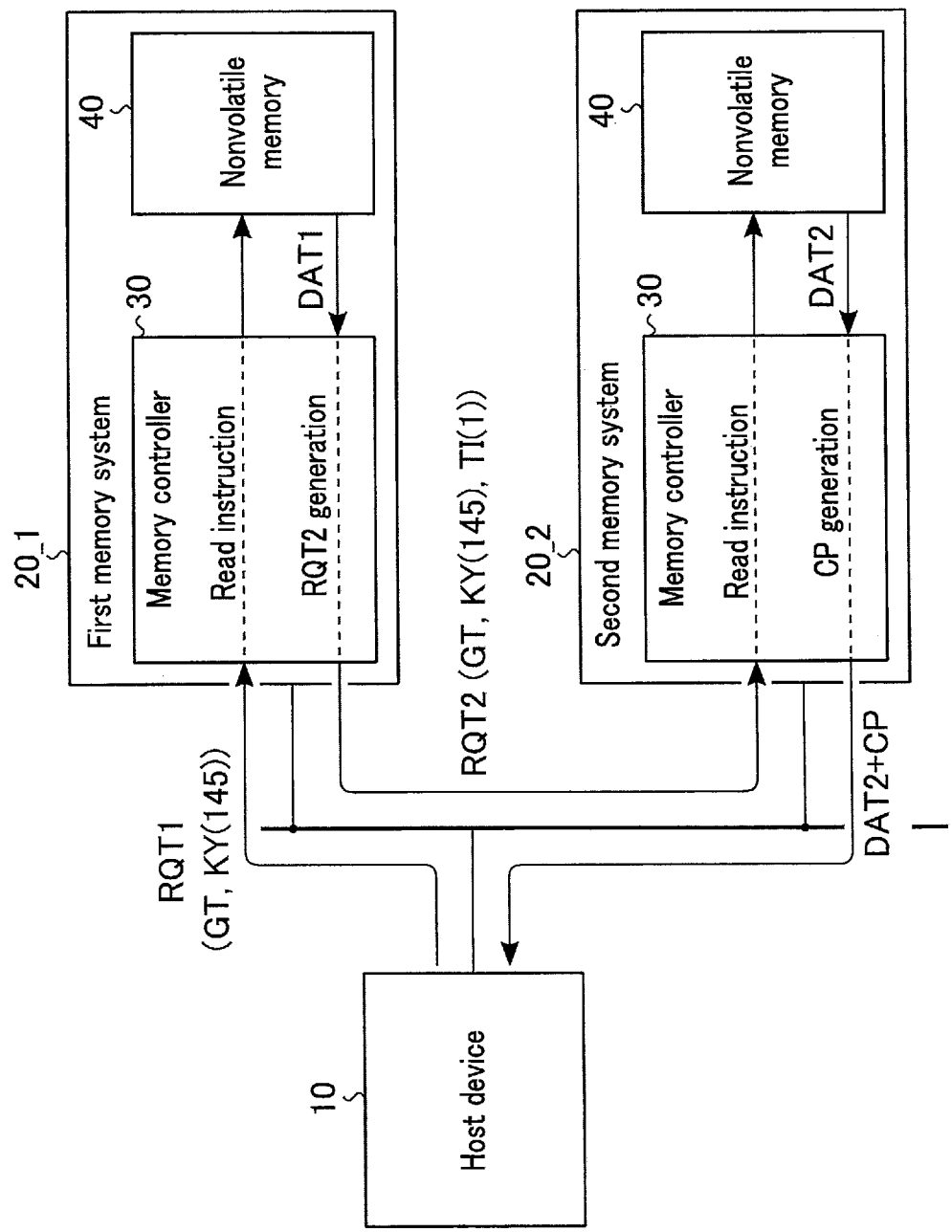
F I G. 14

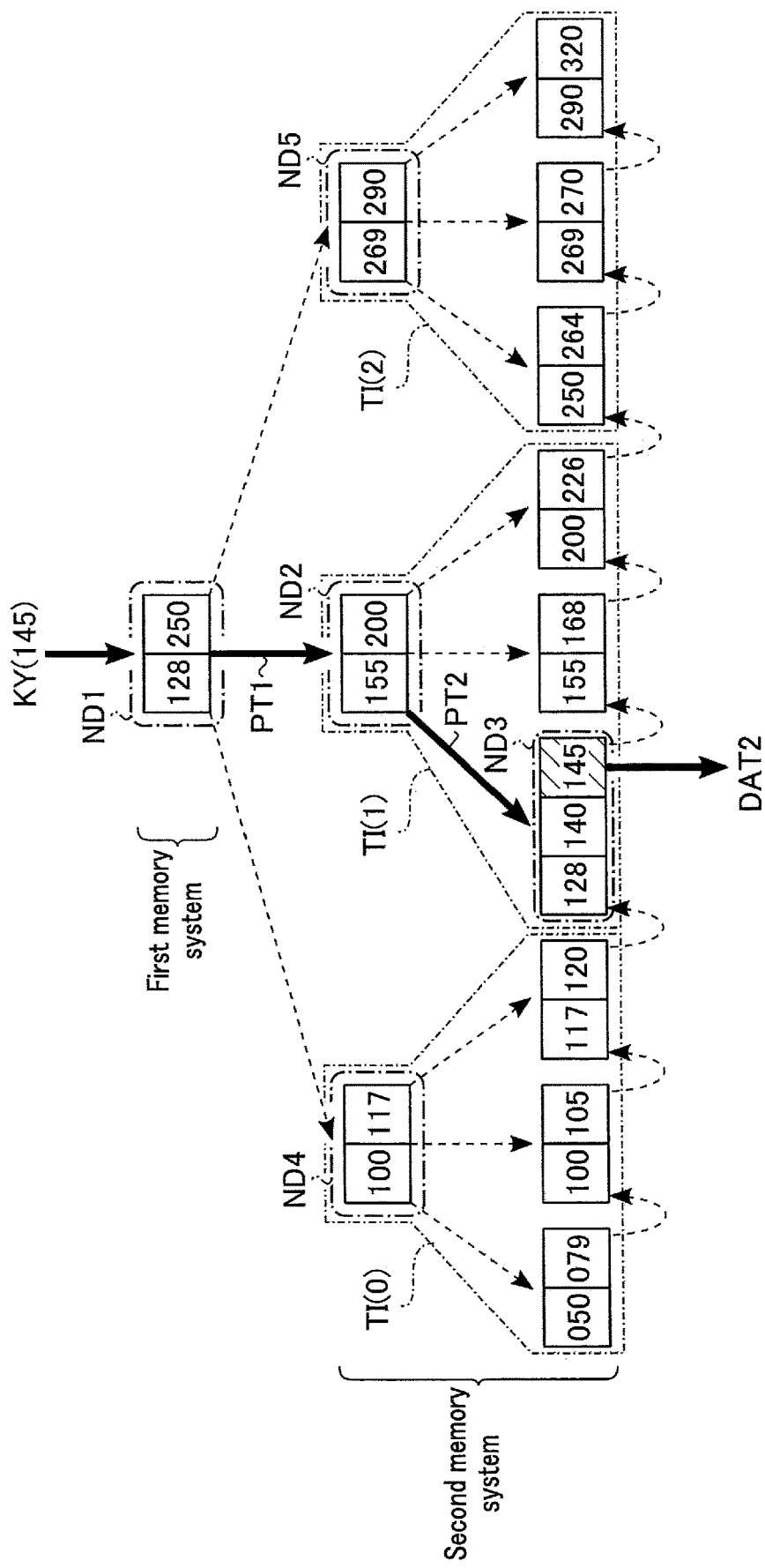
F I G. 15

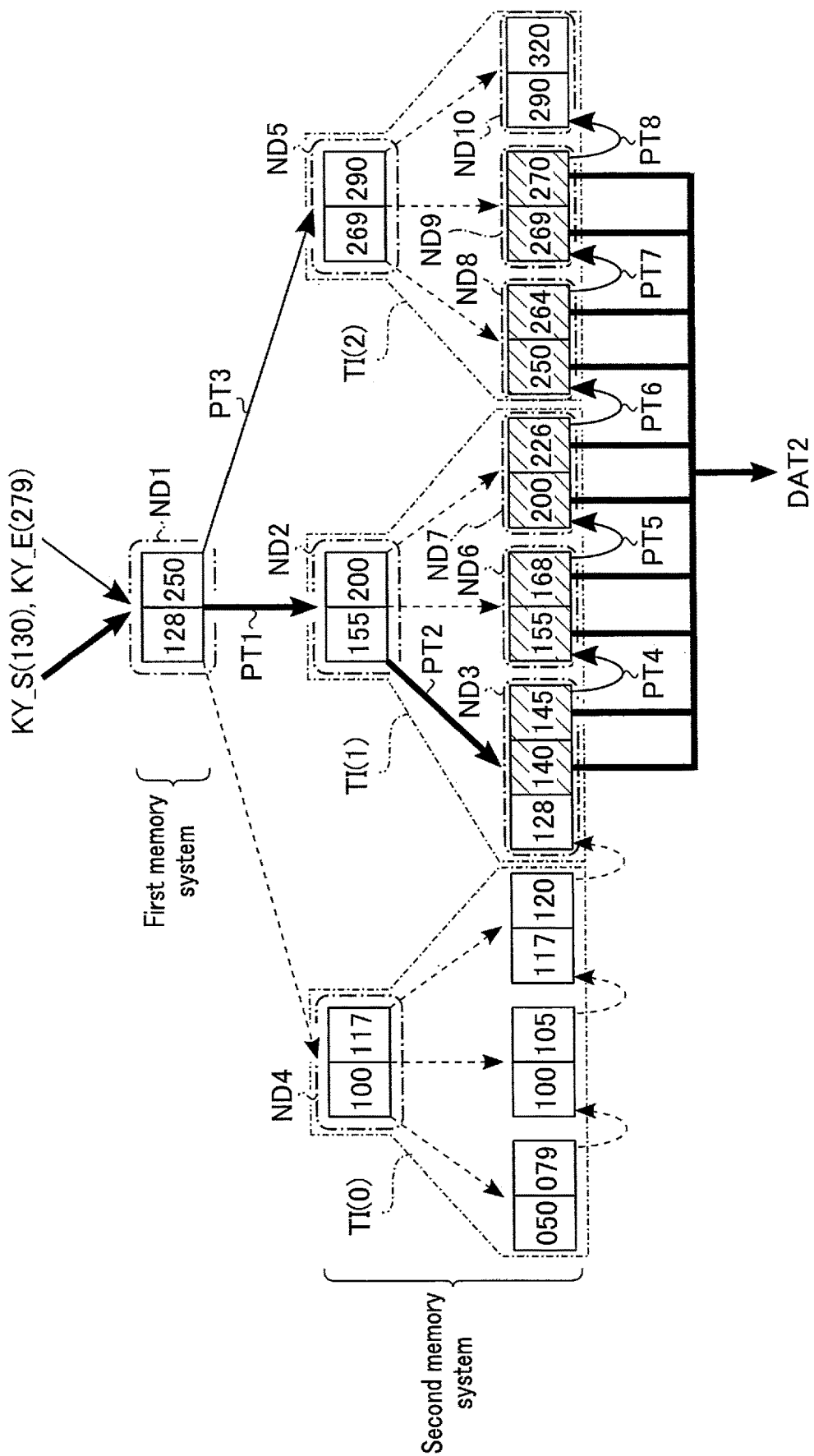
F I G. 17

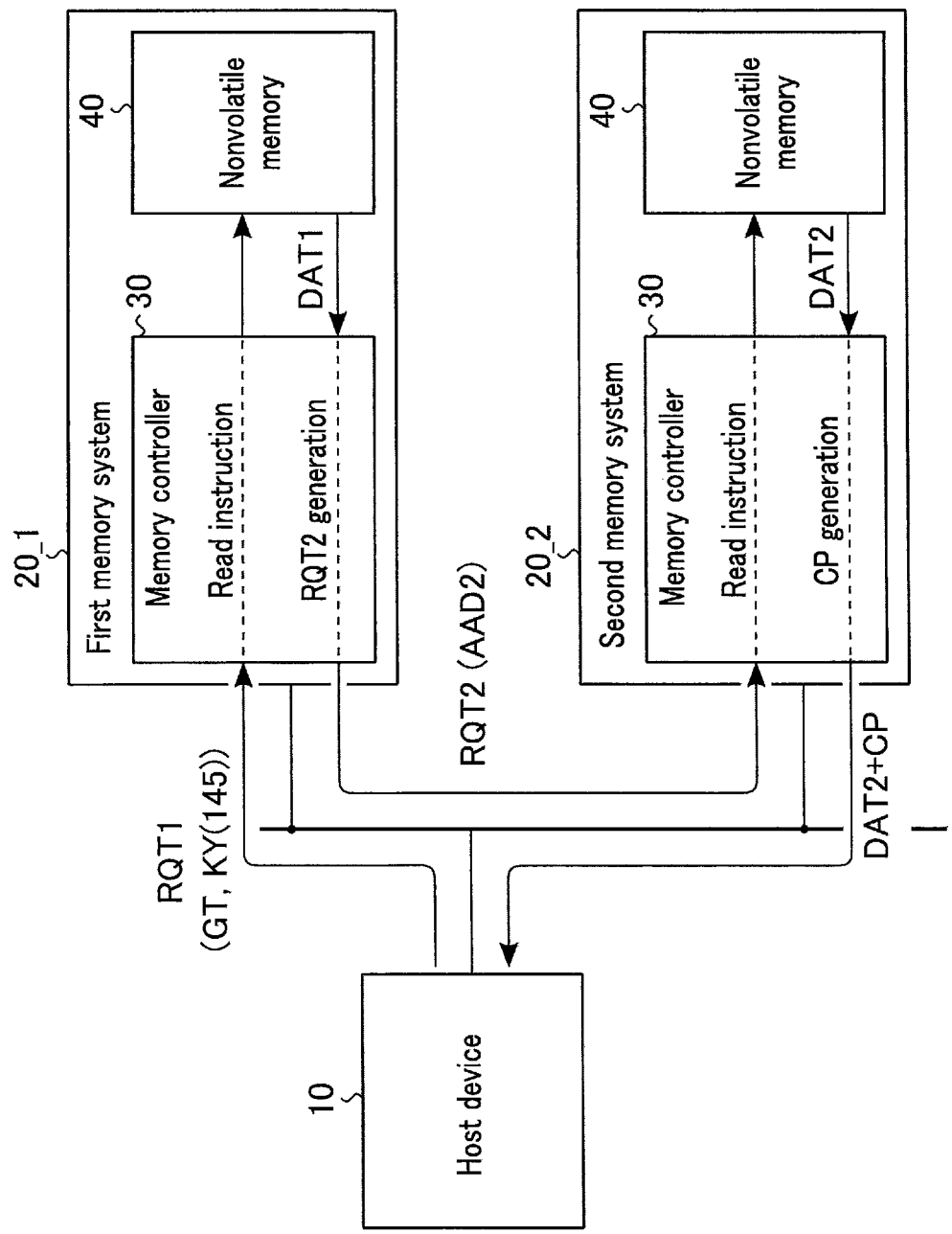
F I G. 18

DATA PROCESSING DEVICE

CROSS-REFERENCE TO RELATED APPLICATION

This application is based upon and claims the benefit of priority from prior Japanese Patent Application No. 2021-040173, filed Mar. 12, 2021; and No. 2021-150443, filed Sep. 15, 2021, the entire contents of which are incorporated herein by reference.

FIELD

Embodiments described herein relate generally to a data processing device.

BACKGROUND

A data processing device including a plurality of memory systems is known.

BRIEF DESCRIPTION OF THE DRAWINGS

FIG. 2 is a block diagram showing an example of single-stage read operation in the data processing device according to the first embodiment.

FIG. 6 is a data flowchart of multistage read operation in the data processing device according to the first embodiment.

FIG. 7 is a block diagram showing a flow of request and completion information in a data processing device according to a first example of a second embodiment.

FIG. 8 is a block diagram showing a flow of request and completion information in a data processing device according to a second example of the second embodiment.

FIG. 9 is a block diagram showing a flow of request and completion information in a data processing device according to a third example of the second embodiment.

FIG. 12 is a block diagram showing an example of multistage read operation corresponding to KVS in a data processing device according to a first example of a fourth embodiment.

FIG. 14 is a block diagram showing an example of multistage read operation corresponding to KVS in a data processing device according to a second example of the fourth embodiment.

FIG. 15 is a diagram showing an example of get operation corresponding to KVS in the data processing device according to the second example of the fourth embodiment.

FIG. 17 is a diagram showing an example of range operation corresponding to KVS in the data processing device according to the third example of the fourth embodiment.

FIG. 18 is a block diagram showing an example of multistage read operation corresponding to KVS in a data processing device according to a fourth example of the fourth embodiment.

DETAILED DESCRIPTION

In general, according to one embodiment, a data processing device includes: a first memory system including a first nonvolatile memory; a second memory system including a second nonvolatile memory; and a host device configured to control the first memory system and the second memory system. The first memory system further includes: a first circuit configured to cause the first nonvolatile memory to perform a read operation of first data based on a first request received from the host device; a second circuit capable of calculating a first access information corresponding to the second memory system based on the first data; and a third circuit configured to generate a second request to cause the second memory system to perform a read operation of second data based on the first access information.

Hereinafter, the embodiments will be described with reference to drawings. The drawings are schematic ones. In the description below, elements having substantially the same functions and configurations will be denoted by the same reference symbols. The numbers after the letters of reference symbols are referred to by the reference signs containing the same letters and are used to distinguish between elements having similar configurations. Where elements denoted by reference symbols including the same letters need not be discriminated from each other, they will be denoted by reference symbols including only letters.

Each of the functional blocks can be implemented as hardware, computer software, or a combination of both. Thus, the functional blocks will generally be described below in terms of their functions to clarify that each of the blocks corresponds to any of the hardware, computer software and combination thereof. It depends on specific embodiments or design constraints imposed on the entire system whether the functions are performed as hardware or software. Those skilled in the art can achieve the functions by various methods for each of the specific embodiments, and the determination of the achievement is included in the scope of the present invention.

1. First Embodiment

1.1 Configuration

Figure 1:
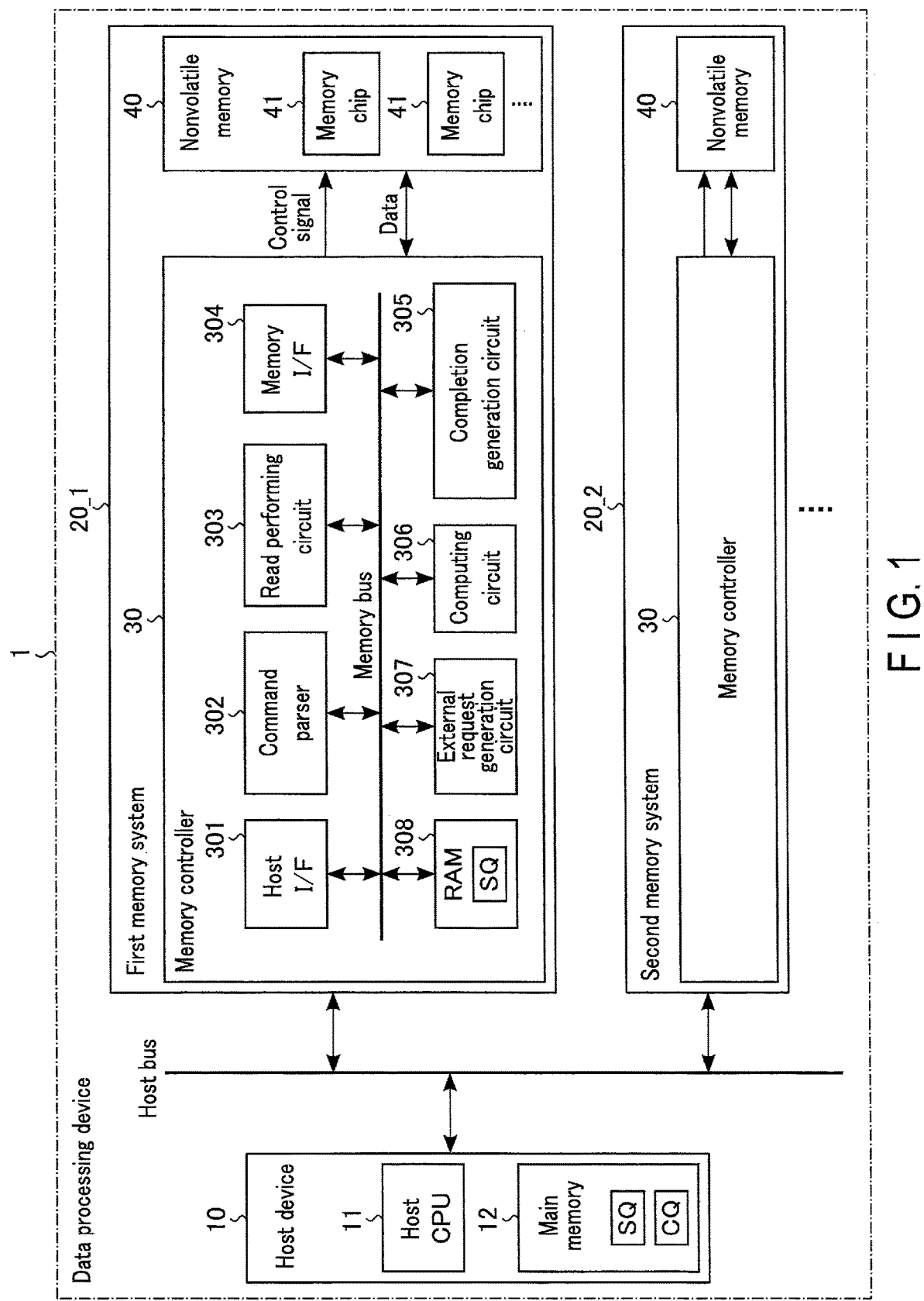
FIG. 1 is a block diagram of a data processing device according to a first embodiment.

First, the configuration of a data processing device 1 will be described with reference to FIG. 1. FIG. 1 is a block diagram showing an example of the overall configuration of the data processing device 1.

As shown in FIG. 1, the data processing device 1 includes a host device 10 and a plurality of memory systems 20. If any one of the memory systems 20 is limited, it will be described as a first memory system 20_1, a second memory system 20_2 or the like. Note that the data processing device 1 of the present embodiment has only to include two or more memory systems 20. The memory systems 20 may have the same configuration or different configurations. For brevity of description, the memory systems 20 will be described as having the same configuration in the present embodiment.

The host device 10 is an information processing device (computing device) that gains access to the memory systems 20.

The host device 10 includes a host central processing unit (CPU) 11 and a main memory 12. The host CPU 11 and the main memory 12 are coupled to each other via, for example, an internal bus.

The host CPU 11 controls the entire data processing device 1. More specifically, for example, the host CPU 11 controls data write operation and data read operation in the memory systems 20, that is, input/output of data to/from the memory systems 20.

The main memory 12 can be used as a work area in which the host CPU 11 executes an operating system (OS), an application program and the like. The main memory 12 includes a submission queue SQ and a completion queue CQ.

The submission queue SQ is an instruction queue used when the host CPU 11 requests (instructs) the memory systems 20 to perform an operation. The submission queue SQ stores a request issued by the host CPU 11 for input/output of data to/from the memory systems 20 (simply referred to as "request" hereinafter). The submission queue SQ has, for example, a plurality of entries corresponding to a plurality of requests, respectively. For example, the main memory 12 includes a plurality of submission queues SQ corresponding to the memory systems 20.

The completion queue CQ is a response queue used to notify the host CPU 11 of status of the request completed by the memory systems 20 (referred to as "completion information" hereinafter). The completion queue CQ has, for example, a plurality of entries corresponding to a plurality of requests, respectively. For example, the main memory 12 includes a plurality of completion queues CQ corresponding to a plurality of memory systems 20.

For example, when a memory system 20 is instructed to perform the read operation, the host CPU 11 first generates a request for the read operation. Then, the host CPU 11 stores the generated request in a submission queue SQ corresponding to the memory system 20 that performs the operation. The request for the read operation includes a plurality of fields corresponding to a command for instructing the read operation (referred to as "read command" hereinafter), a request ID for identifying the request (command), an access destination address, an output destination address and the like. The request ID is used to distinguish a plurality of requests issued by the host CPU 11, and may correspond to, for example, the index of an entry in the submission queue SQ. The access destination address includes, for example, a drive number specifying any one of the memory systems 20 and an address (for example, logical block address) of a nonvolatile memory 40 in the specified memory system 20. It should be noted that the access destination address may not include the drive number. The output destination address is, for example, an address of the main memory 12 in which the read data is stored. The memory system 20 acquires a request from the submission queue SQ and performs the read operation. Then, the memory system 20 generates completion information and stores the generated completion information in the completion queue CQ. The host CPU 11 confirms the completion information in the completion queue CQ and terminates the request.

In the present embodiment, the main memory 12 is provided in the host device 10; however, the configuration is not limited thereto. For example, the main memory 12 may be coupled to a host bus as a single storage device. In the present embodiment, furthermore, a dynamic random access memory (DRAM) is used as the main memory 12; however, the main memory 12 is not limited to a DRAM. For example, another storage medium such as a static random access memory (SRAM), a magneto-resistive random access memory (MRAM), a ferroelectric random access memory (FeRAM), a phase change random access memory (PRAM), and a resistive random access memory (ReRAM) may be used.

The memory systems 20 are each, for example, a solid state drive (SSD) including a nonvolatile memory. The memory systems 20 are each coupled to the host device 10 via the host bus. The memory systems 20 may be coupled to the host device 10 through wireless communication.

As coupling standards for interconnection between the host device 10 and the memory systems 20, small computer system Interface (SCSI), serial attached SCSI (SAS), advanced technology attachment (ATA), serial ATA (SATA), peripheral component interconnect express (PCIe) (registered trademark), Ethernet (registered trademark), Fibre channel, and the like can be used. In the present embodiment, PCIe is applied as a coupling standard for interconnection between the host device 10 and the memory systems 20, and non-volatile memory express (NVMe) (registered trademark) is applied as a communication protocol.

The memory systems 20 each include a memory controller 30 and a nonvolatile memory 40.

The memory controller 30 acquires (receives) a request from the host device 10 and controls the nonvolatile memory 40 based on the acquired request. Specifically, if the request includes a command for instructing the write operation and write data, the memory controller 30 writes the data to the nonvolatile memory 40. If the request includes a read command, the memory controller 30 reads data from the nonvolatile memory 40 and transmits the data to the host device 10.

The memory controller 30 calculates an access destination address of another memory system 20 from, for example, data read based on the request, and generates a request to the memory system 20 corresponding to the access destination address.

The memory controller 30 includes a host interface circuit (host I/F) 301, a command parser 302, a read performing circuit 303, a memory interface circuit (memory I/F) 304, a completion generation circuit 305, a computing circuit 306, an external request generation circuit 307, and a random access memory (RAM) 308. These circuits 301, 302, 303, 304, 305, 306, 307 and 308 are coupled to each other via a memory bus, for example. Note that the memory controller 30 may be, for example, a system on chip (SoC). Each function of the memory controller 30 may be implemented by a dedicated circuit or by firmware to be executed by a processor. In the present embodiment, a dedicated circuit is provided in the memory controller 30.

The host interface circuit 301 is coupled to the host device 10 and another memory system 20 via a host bus to control communications with the host device 10 and the memory system 20. The host interface circuit 301 may include a doorbell register (not shown). The doorbell register corresponds to the submission queues SQ of the host device 10 and the other memory system 20. For example, when valid data is stored in the doorbell register from the host device 10, the host interface circuit 301 acquires a request from the submission queue SQ of the host device 10. The host interface circuit 301 also transmits data read from the nonvolatile memory 40, completion information generated by the completion generation circuit 305, and the like to the host device 10. The host interface circuit 301 may transmit interrupt information to the host CPU 11 to notify that the data and completion information have been stored in the main memory 12. Upon receiving the interrupt information, the host CPU 11 confirms the completion information in the completion queue CQ of the memory system 20. Based on the completion information, the host CPU uses the corresponding data.

The command parser 302 analyzes a command included in the request acquired by the memory system 20. When the analyzed command is, for example, a read command, the command parser 302 transmits a result of the analysis to the read performing circuit 303.

When the command included in the request is, for example, a read command, the read performing circuit 303 instructs the nonvolatile memory 40 to read the corresponding data based on the access destination address included in the request.

The memory interface circuit 304 controls communications between the memory controller 30 and the nonvolatile memory 40. More specifically, the memory interface circuit 304 transmits, for example, an instruction from the read performing circuit 303 as a form (control signal) that is recognizable by the nonvolatile memory 40. The memory controller 30 transmits and receives data to and from the nonvolatile memory 40 via the memory interface circuit 304. When the nonvolatile memory 40 is a NAND flash memory, the memory interface circuit 304 is a NAND flash interface circuit.

The completion generation circuit 305 generates completion information when the request is completed. The completion information includes information such as whether an operation corresponding to the request has been completed normally or which request (command and request ID) the completion information corresponds to. Note that the completion generation circuit 305 of the present embodiment does not generate completion information if the external request generating circuit 307 in a same memory system 20 generates a request to another memory system 20, that is, if the operation corresponding to the request generated by the host device 10 is not completed.

The computing circuit 306 calculates an access information corresponding to a next access by computing the data read from the nonvolatile memory 40. The access information includes an access destination address (drive number and address of the nonvolatile memory 40). Hereinafter, the access destination address will be explained as the access information. Note that the access destination address may be a nonvolatile memory 40 in the corresponding memory system 20 or a nonvolatile memory 40 in another memory system 20. In addition, the memory system 20 may determine that access is unnecessary as a result of computation by the computing circuit 306. It should be noted that the computing circuit 306 may calculate a different output destination address based on the output destination address received from the host device 10.

For example, the access information (the access destination address) may be written (included) in the read data as it is, or may be a result of computation of a plurality of items of data read by a plurality of read operations in the corresponding memory system 20. Note that the data of the corresponding memory system 20 may be read again based on the result of computation of data read a plurality of times, and the computing circuit 306 may calculate an access information (an access destination address) by computing again based on the result. The access information (the access destination address) may be calculated by adding, for example, an offset value obtained from the request to the read data. The access information (the access destination address) may also be written to a node resulting from the search for a B-tree index. More specifically, it is assumed that data having, for example, a tree structure is stored in the nonvolatile memory 40. In this case, first, the memory controller 30 reads first data to traverse the tree. Note that a plurality of read operations may be performed to read the first data. The computing circuit 306 computes the first data. Based on the computation result of the first data, the next data of the tree is read. The memory controller 30 performs a read operation if the next data is present in the nonvolatile memory 40 in the corresponding memory system 20 and generates a request if the next data is present in the nonvolatile memory 40 in the other memory system 20. The search operation of the next data is repeated until the target data is reached. An example of application of a B-tree index is Key-Value-Store (KVS). In this example, the request generated by the host device 10 includes Key. The memory system 20 finds an entry matching the Key from the memory systems 20 including the other entries, and transmits Value (data) corresponding to the entry to the host device 10. If the memory system 20 causes another memory system 20 to search the entry corresponding to the Key, the access information includes the Key.

The drive number may be written to the read data as it is. If a logical block address capable of identifying all of the memory systems 20 is allocated to the nonvolatile memory 40 of each of the memory systems 20, the drive number may be calculated from the logical block address.

When the corresponding memory system 20 transmits data to the host device 10 or when the corresponding memory system 20 requests another memory system 20 to perform a read operation, the computing circuit 306 may calculate a data size. For example, the data size can be calculated using at least one of the read data and the request. The computing circuit 306 may also calculate (determine) the operation contents of the request to be executed by the other memory system 20, namely, the command using at least one of the read data and the request.

The external request generation circuit 307 generates a request to another memory system 20 when access to the memory system 20 is required as a result of computation by the computing circuit 306. The request in this case includes a read command and an access destination address of the memory system 20, which are based on the computation result, a request ID and an output destination address, which are assigned to the request acquired from the host device 10, and the like. The external request generation circuit 307 stores the generated request in a submission queue SQ in the RAM 308.

The RAM 308 includes a submission queue SQ for storing a request generated by the external request generation circuit 307 in the memory system 20. The RAM 308 may be, for example, a DRAM, an SRAM, an MRAM, an FeRAM, a PRAM or an ReRAM. Note that the RAM 308 may be provided inside the memory controller 30, provided outside the memory controller 30 in the memory system 20, or directly coupled to the host bus.

For example, when the memory system 20 causes another memory system 20 to perform a read operation based on the read result, the memory system 20 stores the generated request in the submission queue SQ of the RAM 308. The other memory system 20 acquires the request from the submission queue SQ of the RAM 308 in the memory system 20 which generated the request, and performs the read operation.

The nonvolatile memory 40 includes, for example, a plurality of NAND flash memory chips (also referred to simply as memory chips) 41. For example, in a NAND flash memory, generally, a write operation and a read operation are performed in a data unit called a page, and an erase operation is performed in a data unit called a block.

1.2 Read Operation

Next is a description of a read operation. The read operation of the present embodiment includes a single-stage read operation and a multistage read operation.

The single-stage read operation is an operation in which the host device 10 reads data from one memory system 20. The multistage read operation is an operation in which the host device 10 reads data using two or more memory systems 20 and determines an access destination address of another memory system 20 by data read from the memory systems 20.

1.2.1 Single-Stage Read Operation

First, a flow of data and the like in a single-stage read operation will be described with reference to FIG. 2. FIG. 2 is a block diagram showing an example of the single-stage read operation.

As shown in FIG. 2, for example, when the host device 10 reads data from the first memory system 20_1, the host device 10 transmits a first request RQT1 to the first memory system 20_1. That is, the first memory system 20_1 acquires the first request RQT1 from the submission queue SQ of the main memory 12. At this time, the first request RQT1 includes a read command RD1 corresponding to the single-stage read operation, a request ID, an access destination address AAD1 corresponding to the first memory system 20_1, and an output destination address OAD.

Based on the first request RQT1, the memory controller 30 of the first memory system 20_1 transmits a read instruction to the nonvolatile memory 40 and reads data DAT1 from a page of the nonvolatile memory 40 corresponding to the access destination address AAD1. When the read command RD1 is included in the first request RQT1, the memory controller 30 generates completion information CP without computing the data DAT1. After the completion information CP is generated, the memory controller 30 transmits the data DAT1 and the completion information CP to the main memory 12 of the host device 10. The data DAT1 is stored in the output destination address OAD of the main memory 12. The completion information. CP is stored in a completion queue CQ of the main memory 12.

1.2.2 Multistage Read Operation

Figure 3:
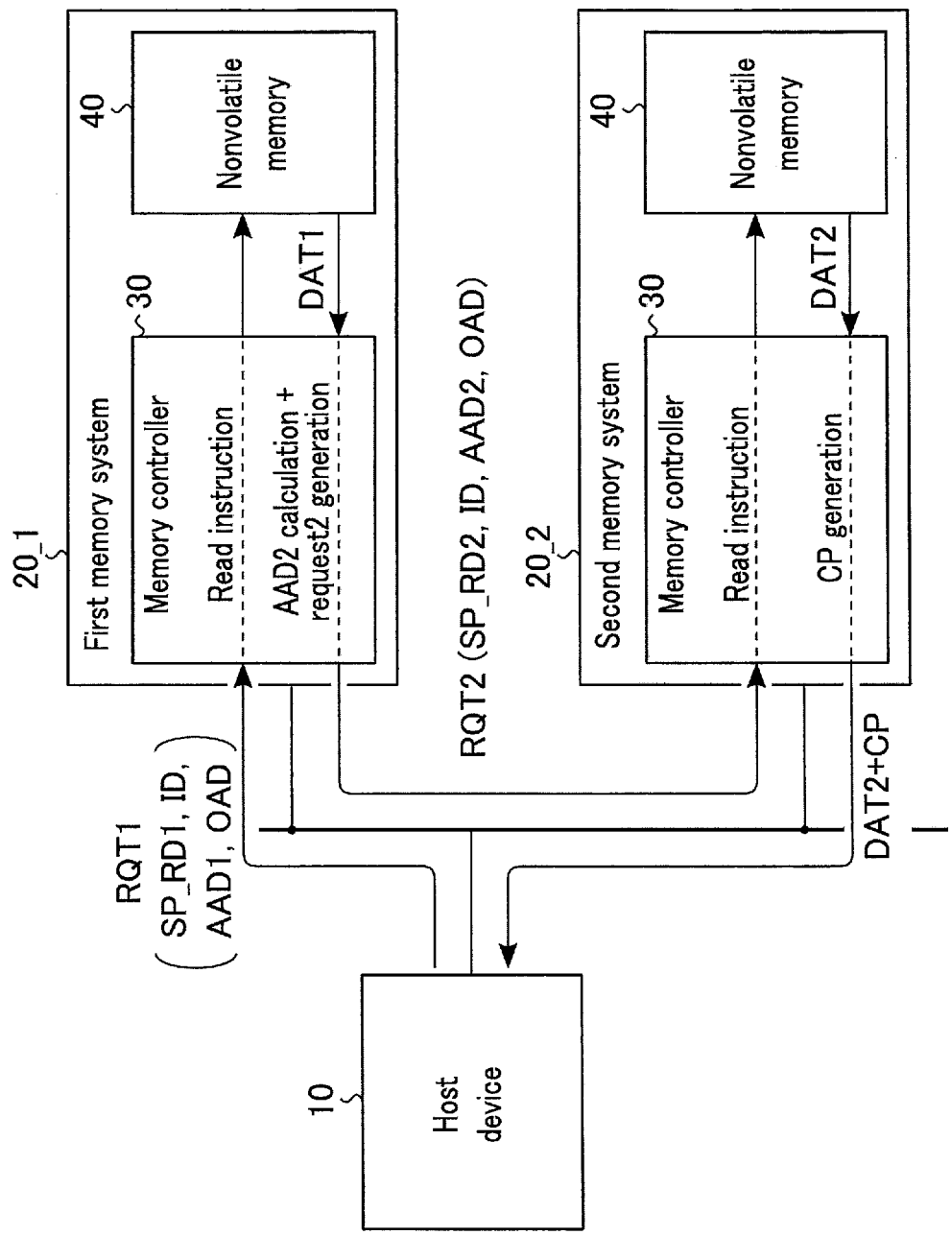
FIG. 3 is a block diagram showing an example of multistage read operation in the data processing device according to the first embodiment.

Then, a flow of data and the like in a multistage read operation will be described with reference to FIG. 3. FIG. 3 is a block diagram showing an example of the multistage read operation. For brevity of description, FIG. 3 shows a two-stage read operation, but a multistage read operation of three or more stages may be used.

As shown in FIG. 3, when the host device 10 reads data DAT2 from the second memory system 20_2 using the data DAT1 of the first memory system 20_1, the host device 10 first transmits the first request RQT1 to the first memory system 20_1. That is, the first memory system 20_1 acquires the first request RQT1 from the submission queue. SQ of the main memory 12. At this time, the first request RQT1 includes a read command SP_RD1 corresponding to the multistage read operation, a request ID, an access destination address AAD1 corresponding to the first memory system 20_1, and an output destination address OAD.

Based on the first request RQT1, the memory controller 30 of the first memory system 20_1 transmits a read instruction to the nonvolatile memory 40, and reads data DAT1 from a page of the nonvolatile memory 40 corresponding to the access destination address AAD1. The memory controller 30 uses the read data DAT1 to calculate an access destination address AAD2 of the second memory system 20_2. Then, the memory controller 30 generates a second request RQT2 to cause the second memory system 20_2 to perform a read operation. At this time, the second request RQT2 includes a read command SP_RD2 corresponding to the multistage read operation, a request ID, an access destination address AAD2 corresponding to the second memory system 20_2, and an output destination address OAD. The request ID and the output destination address OAD are the same as the first request RQT1. It should be noted that the output destination address OAD of the second request RQT2 may be calculated by the computing circuit 306 or the external request generation circuit 307 based on the output destination address OAD of the first request RQT1. The memory controller 30 stores the generated second request RQT2 in the submission queue SQ in the RAM 308. Instead of issuing a read command SP_RD2 corresponding to the multistage read operation, the memory controller 30 may issue a read command RD2 corresponding to the single-stage read operation. In this case, based on the read command RD2, the second memory system 20_2 performs the single-stage read operation, and the computing process to be performed by the computing circuit 306 in the second memory system 20_2 can be omitted.

The second memory system 20_2 acquires a second request RQT2 from the RAM 308 (submission queue SQ) of the first memory system 20_1. Based on the second request RQT2, the memory controller 30 of the second memory system 20_2 transmits a read instruction to the nonvolatile memory 40 and reads data DAT2 from a page of the nonvolatile memory 40 corresponding to the access destination address AAD2. In the example of FIG. 3, as a result of calculation of data DAT2, the memory controller 30 of the second memory system 20_2 determines that the request RQT to another memory system 20 need not be generated, and generates completion information CP. When the memory controller 30 generates the completion information CP, the memory controller 30 transmits the read data DAT2 and the completion information CP to the host device 10. The data DAT2 is stored in the output destination address OAD of the main memory 12. The completion information CP is stored in the completion queue CQ of the main memory 12. In the multistage read operation, therefore, a memory system 20 to which the host device 10 transmits a request differs from a memory system 20 from which the host device 10 receives completion information CP.

Note that the memory controller 30 of the second memory system 20_2 may calculate the data DAT2 and select whether or not to allow another memory system 20 to further execute a request. That is, the second memory system 20_2 determines the presence or absence of a multistage read operation of the third stage. When another memory system 20 is caused to execute a request, the memory controller 30 of the second memory system 20_2 generates a request (third request) without generating completion information CP, like the memory controller 30 of the first memory system 20_1. Like the second request RQT2, the third request includes a request ID and an output destination address OAD. After the third stage, too, the multistage read operation is repeated in the same manner.

In the examples of FIGS. 2 and 3, the single-stage read operation and the multistage read operation are different in read command, but the operation is not limited to this case. For example, the single-stage read operation and the multistage read operation may use the same read command as one included in the first request RQT1. In this case, the first memory system 20_1 may select a single-stage read operation or a multistage read operation from the result of calculation of the read data DAT1.

1.2.3 Flow of Read Operation

Figure 4:
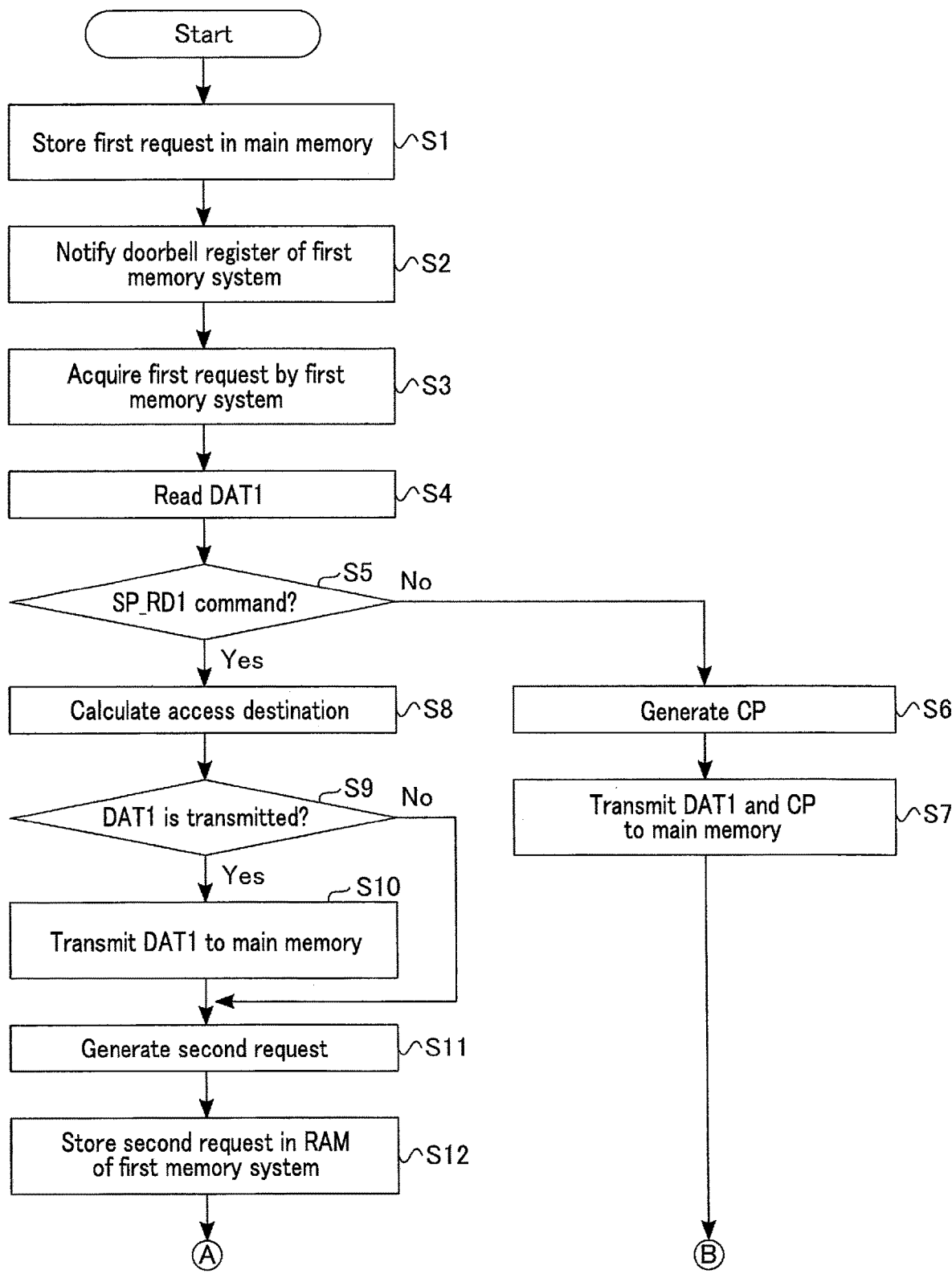
FIG. 4 is a flowchart of read operation in the data processing device according to the first embodiment.
Figure 5:
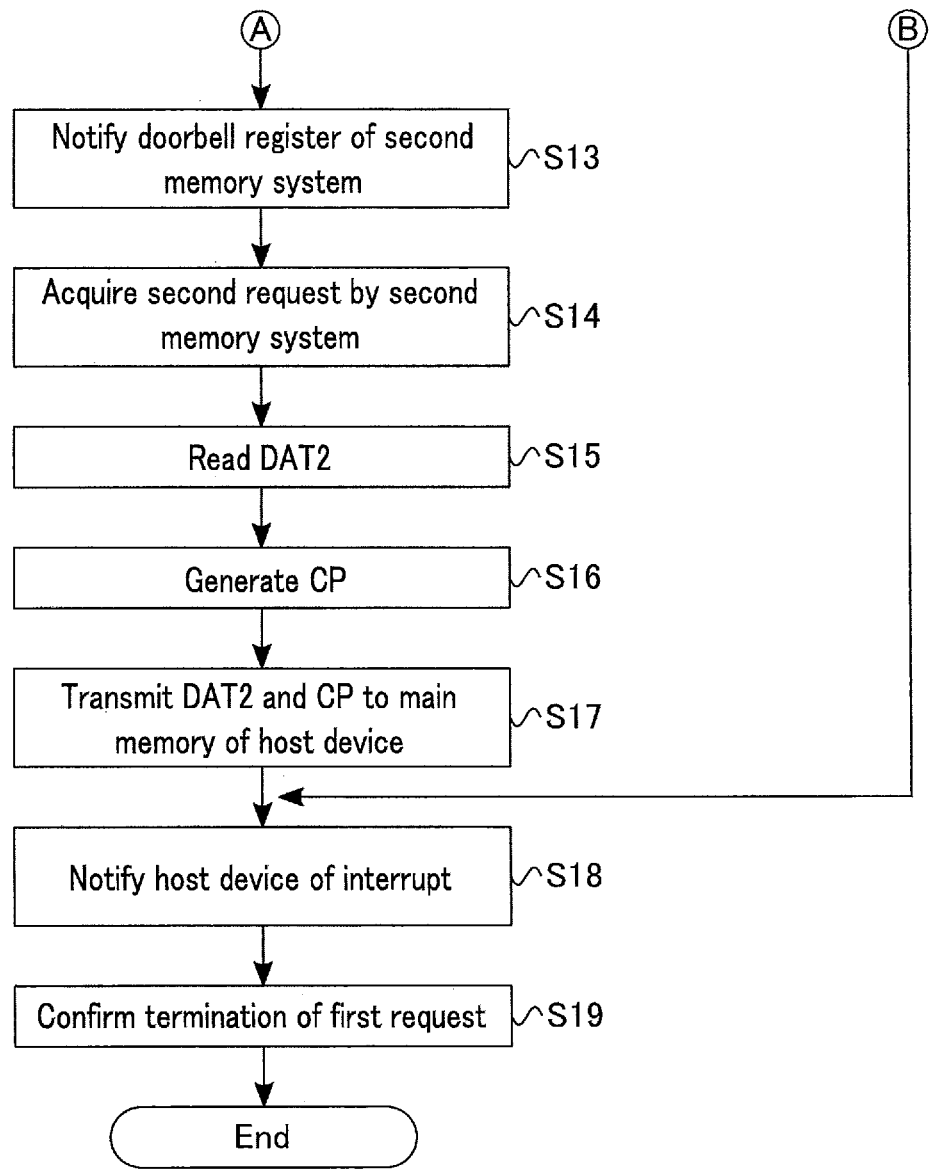
FIG. 5 is a flowchart of read operation in the data processing device according to the first embodiment.

Then, an example of the flow of a read operation will be described with reference to FIGS. 4 and 5. FIGS. 4 and 5 show a flowchart of the read operation. In the flowchart of FIGS. 4 and 5, the single-stage read operation and the multistage read operation are different in read command. For brevity of description, a two-stage read operation is shown as the multistage read operation. More specifically, the host device 10 reads the data DAT2 of the second memory system 20_2 using the data DAT1 of the first memory system 20_1.

As shown in FIG. 4, first, the host CPU 11 of the host device 10 generates a first request RQT1 and stores the first request RQT1 in the submission queue SQ of the main memory (step S1).

The host CPU 11 notifies the doorbell register of the first memory system 20_1 that the first request RQT1 is stored in the submission queue SQ (step S2). That is, the host CPU 11 transmits valid data to the doorbell register of the first memory system 20_1.

When the valid data received from the host device 10 is stored in the doorbell register, the host interface circuit 301 of the first memory system 20_1 acquires a first request RQT1 from the submission queue SQ of the main memory 12 of the host device 10 (step S3).

The memory controller 30 of the first memory system 20_1 reads the data DAT1 from the nonvolatile memory 40 based on the read command (read command RD1 or read command SP_RD1 command) and the access destination address AAD1 of the first request RQT1 (step S4). More specifically, the command parser 302 analyzes the command of the first request RQT1. The read performing circuit 303 instructs the nonvolatile memory 40 to read data based on the analysis result of the command.

When the command included in the first request RQT1 is the read command RD1, that is, when it is not the read command SP_RD1 (No in step S5), the computing circuit 306 does not perform computation using the data DAT1 because the single-stage read operation is selected. The completion generation circuit 305 generates completion information CP (step S6). The first memory system 20_1 transmits the data DAT1 and the completion information CP to the main memory 12 of the host device 10 (step S7). The data DAT1 is stored in the output destination address OAD of a main memory 12, and the completion information CP is stored in the completion queue CQ of the main memory 12.

On the other hand, when the command included in the first request RQT1 is the read command SP_RD1 (Yes in step S5), the multistage read operation is selected by the read performing circuit 303. The computing circuit 306 computes the next access destination address AAD2 using the data DAT1 (step S8).

When the first memory system 20_1 transmits the data DAT1 to the host device 10 based on the first request RQT1 or the result of computation of the data DAT1 by the computing circuit 306 (Yes in step S9), the first memory system 20_1 transmits at least part of the data DAT1 to the main memory 12 of the host device 10 (step S10). For example, when data to be read by the host device 10 is divided and stored in the first memory system 20_1 and the second memory system 20_2, the data DAT1 whose data size is calculated by, for example, the computing circuit 306 is transmitted to the main memory 12.

If the data DAT1 is not transmitted to the host device (No in step S9) or after step S10, the external request generation circuit 307 generates a second request RQT2 (step S11). The generated second request RQT2 is stored in the submission queue SQ of the RAM 308 of the first memory system 20_1 (step S12). In the present embodiment, the second request RQT2 is stored in the RAM 308 of the first memory system 20_1, but it is not limited thereto. For example, the second request RQT2 may be stored in the submission queue SQ of the next access destination memory system 20, namely, the submission queue SQ of the RAM 308 of the second memory system 20_2, and the second request RQT2 may be stored in the submission queue SQ of the main memory 12 of the host device 10.

As shown in FIG. 5, the first memory system 20_1 notifies the doorbell register of the second memory system 20_2 that the second request RQT2 has been stored in the submission queue SQ (step S13). That is, the first memory system 20_1 transmits valid data to the doorbell register of the second memory system 20_2.

When the valid data received from the first memory system 20_1 is stored in the doorbell register, the host interface circuit 301 of the second memory system 20_2 acquires the second request RQT2 from the submission queue SQ of the RAM 308 of the first memory system 20_1 (step S14).

The memory controller 30 of the second memory system 20_2 reads the data DAT2 from the nonvolatile memory 40 based on the access destination address AAD2 and the read command SP_RD2 of the second request RQT2 (step S15). More specifically, the command parser 302 analyzes the command of the second request RQT2. The read performing circuit 303 instructs the nonvolatile memory 40 to read the data DAT2 based on the analysis result of the command.

Then, the completion generation circuit 305 of the second memory system 20_2 generates completion information CP (step S16).

The second memory system 20_2 transmits the data DAT2 and the completion information CP to the main memory 12 of the host device 10 based on the request ID and the output destination address OAD (step S17). The data DAT2 is stored in the output destination address OAD of the main memory 12, and the completion information CP is stored in the completion queue CQ of the main memory 12.

After the completion of step S7 or step S17, that is, after the completion information CP is stored in the completion queue CQ of the main memory 12 in the single-stage read operation or the multistage read operation, the memory system 20 that has generated the completion information CP notifies the host device 10 of interrupt information (step S18).

The host CPU 11 confirms the completion information CP based on the interruption information. Then, the host CPU 11 uses data (at least one of DAT1 and DAT2) based on the completion information CP, and terminates the first request RQT1 (step S19).

In the present embodiment, the memory system 20 notifies the host device 10 of interrupt information, as described above, but it is not limited thereto. Since the host CPU 11 periodically monitors the completion queue CQ, the completion of the first request RQT1 can be confirmed without notification of interrupt information.

1.2.4 Commands and Data Flow in Multistage Read Operation

The commands and data flow in the multistage read operation will be described below with reference to FIG. 6. FIG. 6 is a chart showing an example of the commands and flow of data and the like in the multistage read operation. Note that the step numbers in parentheses in FIG. 6 correspond to those of the flowchart of FIGS. 4 and 5.

As shown in FIG. 6, the host CPU 11 issues a read command SP_RD1 for instructing a multistage read operation and stores the read command SP_RD1 (first request RQT1) in the submission queue SQ of the main memory 12 (step S1). Then, the host CPU 11 notifies the doorbell register of the first memory system 20_1 that the read command SP_RD1 has been stored (step S2).

Upon notifying the doorbell register, the first memory system 20_1 acquires the read command SP_RD1 (first request RQT1) from the submission queue SQ of the main memory 12 (step S3). The first memory system 20_1 reads the data DAT1 from the internal nonvolatile memory 40 based on the read command SP_RD1 (step S4). The first memory system 20_1 calculates the next access destination address AAD2 using the data DAT1 (step S8). The first memory system 20_1 may transmit the data DAT1 to the main memory 12 based on the first request RQT1 (step S10). The first memory system 20_1 generates a read command SP_RD2 (second request RQT2) based on the next access destination address AAD2 (step S11). The first memory system 20_1 stores the read command SP_RD2 (second request RQT2) in the submission queue SQ of the RAM 308 of the first memory system 20_1 (step S12). Then, the first memory system 20_1 notifies the doorbell register of the second memory system 20_2 that the read command SP_RD2 has been stored (step S13).

Upon notifying the doorbell register, the second memory system 20_2 acquires the read command SP_RD2 (second request RQT2) from the RAM 308 (submission queue SQ) of the first memory system 20_1 (step S14). The second memory system 20_2 reads the data DAT2 from the internal nonvolatile memory 40 based on the read command SP_RD2 (step S15). Then, the second memory system 20_2 generates completion information CP (step S16). Then, the second memory system 20_2 transmits the data DAT2 and completion information CP to the main memory 12 (step S17). The completion information CP is stored in the completion queue CQ of the main memory 12. The second memory system 20_2 notifies the host CPU 11 of interrupt information (step S18).

1.3 Advantages of Present Embodiment

With the configuration according to the present embodiment, it possible to provide a data processing device capable of improving the throughput. This advantage will be described in detail.

For example, a data processing device including a plurality of memory systems may calculate an access destination address AAD2 using data DAT1 stored in a first memory system and read data DAT2 from a second memory system corresponding to the access destination address AAD2. In this case, the host CPU of a host device generates a first request RQT1 to the first memory system, calculates the access destination address AAD2 using the data DAT1 received from the first memory system, and generates a second request RQT2 to the second memory system. The host bus connecting the host device and the memory systems is therefore used to transmit and receive the first request RQT1, first data DAT1, second request RQT2, second data DAT2 and completion information CP.

On the other hand, with the configuration according to the present embodiment, the memory systems 20 of the data processing device 1 each include the computing circuit 306, external request generation circuit 307 and RAM 308 (submission queue SQ). For example, the first memory system 20_1 can calculate the access destination address AAD2 of the second memory system 20_2 using the data DAT1 read from the internal nonvolatile memory 40 and generate the second request RQT2 to the second memory system 20_2. Then, the first memory system 20_1 can store the generated second request RQT2 in the internal submission queue SQ. That is, the memory system 20 can request another memory system 20 to perform an operation without using the host device 10. Thus, the host CPU 11 can offload the calculation of the access destination address AAD2 and generation of the second request RQT2 using the data DAT1 onto the memory system 20. Thus, latency viewed from the host CPU can be decreased, and the use of resources of the host CPU 11 can be decreased.

In the first memory system 20_1, the output destination address OAD and the request ID issued by the host device 10 can be included in the second request RQT2. The second memory system 20_2 can thus transmit the data DAT2 and completion information CP directly to the host device 10 without using the first memory system 20_1. Since, therefore, requests and data transferred between the host device 10 and the memory systems 20 can be decreased, the bandwidth of data transmission in the host bus connecting the host CPU 11 and the memory system 20 can be decreased. The throughput of the data processing device 1 can thus be improved.

2. Second Embodiment

Next is a description of a second embodiment. The second embodiment is directed to three examples of a method of transmitting completion information CP in the multistage read operation. Hereinafter, differences from the first embodiment will be mainly described.

2.1 First Example

First, a first example will be described. In the first example, the main memory 12 includes a plurality of completion queues CQ corresponding to their respective memory systems 20. Below is a description of a case where completion information CP is stored in the completion queue CQ corresponding to one of the memory systems 20 for the first request RQT1 issued by the host device 10. FIG. 7 is a diagram showing an example of a flow of the request RQT and completion information CP between the host device 10 and the memory systems 20. In the example of FIG. 7, the data processing device 1 includes n (n is an integer of 3 or more) memory systems 20. Hereinafter, the memory systems will be referred to as a first memory system 20_1, a second memory system 20_2, . . . and an n-th memory system 20_n. The submission queues corresponding to the first memory system 20_1 to the n-th memory system 20_n will be referred to as SQ1 to SQn, and the completion queues corresponding thereto will be referred to as CQ1 to CQn.

As shown in FIG. 7, the main memory 12 of the host device 10 in the present example includes a submission queue SQ1 corresponding to the first memory system 20_1, and completion queues CQ1 to CQn corresponding to the first memory system 20_1 to the n-th memory system 20_n. The RAM 308 of the first memory system 20_1 includes submission queues SQ2 to SQn corresponding to the second memory system 20_2 to the n-th memory system 20_n.

The host CPU 11 generates a first request RQT1 and stores the generated first request RQT1 in the submission queue SQ1. Then, the host CPU 11 notifies the doorbell register of the first memory system 20_1 that the first request RQT1 has been stored.

When the first memory system 20_1 acquires the first request RQT1 from the submission queue SQ1 of the main memory 12, the first memory system 20_1 performs the read operation of the data DAT1 and calculates the access destination address AAD2. For example, when the first memory system 20_1 determines that the second request RQT2 need not be generated as a result of the calculation, the first memory system 20_1 generates completion information CP and then transmits the data DAT1 and completion information CP to the main memory 12. At this time, the completion information CP is stored in the completion queue CQ1 of the main memory 12.

When the first memory system 20_1 generates the second request RQT2 as a result of the calculation, the first memory system 20_1 stores the second request RQT2 in any one of the submission queues SQ2 to SQn based on the calculated access destination address AAD2, and notifies the doorbell register of the memory system 20 corresponding to the second request RQT2. The notified memory system 20 acquires the second request RQT2 from the corresponding submission queue SQ of the RAM 308 of the first memory system 20_1, and performs the read operation of the data DAT2. For example, when the doorbell register of the second memory system 20_2 is notified, the second memory system 20_2 acquires the second request RQT2 from the submission queue SQ2 of the RAM 308 and performs the read operation of the data DAT2.

The memory system 20 which has performed a read operation in response to the second request RQT2 generates the completion information CP and then transmits the data DAT2 and the completion information CP to the main memory 12. At this time, the completion information CP is stored in the corresponding completion queue CQ of the main memory 12. For example, in the case of the second memory system 20_2, the completion information CP is stored in the completion queue CQ2. For example, in the n-th memory system 20_n, the completion information CP is stored in the completion queue CQn.

The present example is directed to a case where the second request RQT2 is stored in any of the submission queues SQ2 to SQn of the RAM 308 of the first memory system 20_1 that has generated the second request RQT2, but it is not limited to the case. For example, the second request RQT2 may be stored in the submission queue SQ of the memory system 20 to which the second request RQT2 is transmitted, and the second request RQT2 may be stored in the submission queue SQ of the main memory 12.

2.2 Second Example

Next is a description of a second example. In the second example, a set of a submission entry SE and a completion entry CE corresponding to each request is provided in the main memory 12. The memory system 20 that generates the completion information CP stores the completion information CP in the completion entry CE corresponding to the submission entry SE in which the request is stored. FIG. 8 is a diagram showing an example of a flow of the request RQT and the completion information CP between the host device 10 and the memory systems 20. Hereinafter, differences from the first example will be mainly described.

As shown in FIG. 8, the main memory 12 of the host device 10 of the present example is provided with one submission and completion (SC) queue SCQ in place of the submission queue SQ and the completion queue CQ. The SC queue SCQ is a queue in which the request and completion information CP are stored. A set of the submission entry SE and the completion entry CE corresponding to each request is provided in the SC queue SCQ. The submission entry SE is an entry in which one request is stored. The completion entry CE is an entry in which one item of completion information CP is stored. In the example of FIG. 8, m (m is an integer of 3 or more) submission entries SE and completion entries CE are provided. Hereinafter, m submission entries will be referred to as SE1 to SEm, and m completion entries will be referred to as CE1 to CEm. Then, for example, the submission entry SE1 and the completion entry CE1 will be one set. In the example of FIG. 8, the submission entry SE1 and the completion entry CE1 are arranged side by side, but the storage locations (memory areas) of the submission entry SE1 and the completion entry CE1 in the memory space of the main memory 12 may be separated from each other. In addition, the submission entry SE1 and the completion entry CE1 may be provided in different memory devices.

The host CPU 11 generates a first request RQT1 and stores the generated first request RQT1 in, for example, the submission entry SE1. The host CPU 11 notifies the doorbell register of the first memory system 20_1 that the first request RQT1 has been stored in the submission entry SE1.

When the first memory system 20_1 acquires the first request RQT1 from the submission entry SE1 of the main memory 12, the first memory system 20_1 performs the read operation of data DAT1 and calculates an access destination address AAD2. For example, when the first memory system 20_1 determines that the second request RQT2 need not be generated as a result of the calculation, the first memory system 20_1 generates completion information CP and then transmits the data DAT1 and completion information CP to the main memory 12. At this time, the completion information CP is stored in the completion entry CE1 corresponding to the submission entry SE1.

When the first memory system 20_1 generates a second request RQT2 as a result of the calculation, the first memory system 20_1 stores the second request RQT2 in any one of the submission queues SQ2 to SQn and notifies the doorbell register of the memory system 20 corresponding to the second request RQT2, as in the first example. The notified memory system 20 acquires the second request RQT2 from the corresponding submission queue SQ of the RAM 308 of the first memory system 20_1, and performs the read operation of data DAT2. Then, as in the first example, the memory system 20, which has performed the read operation of the data DAT2 in response to the second request RQT2, generates completion information CP and then transmits the data DAT2 and the completion information CP to the main memory 12. At this time, the completion information CP is stored in the completion entry CE1. In the present example, therefore, regardless of the memory system 20 that has generated the completion information CP, the completion information CP is stored in the completion entry CE1 corresponding to the submission entry SE1 in which the first request RQT1 is stored.

2.3 Third Example

Next is a description of a third example. In the third example, the first memory system 20_1 transmits requests RQT to one or more memory systems 20. In this case, the first memory system 20_1 which has acquired a first request RQT1 from the submission queue SQ of the main memory 12 transmits the completion information CP to the completion queue CQ1 of the main memory 12. FIG. 9 is a diagram showing an example of a flow of the request RQT and the completion information CP between the host device 10 and the memory system 20. Hereinafter, differences from the first and second examples will be mainly described.

As shown in FIG. 9, the main memory 12 of the host device 10 of the present example includes a submission queue SQ1 and a completion queue CQ1 corresponding to the first memory system 20_1. The RAM 308 of the first memory system 20_1 includes submission queues SQ2 to SQn and completion queues CQ2 to CQn corresponding to the second memory system 20_2 to the n-th memory system 20_n.

The host CPU 11 generates a first request RQT1 and stores the generated first request RQT1 in the submission queue SQ1. Then, the host CPU 11 notifies the doorbell register of the first memory system 20_1 that the first request RQT1 has been stored.

When the first memory system 20_1 acquires the first request RQT1 from the submission queue SQ1 of the main memory 12, the first memory system 20_1 performs the read operation of data DAT1 and calculates an access destination address AAD. For example, when the first memory system 20_1 determines that the data DAT1 need not be read in another memory system 20 as a result of the calculation, the first memory system 20_1 generates completion information CP and then transmits the data DAT1 and the completion information CP to the main memory 12. At this time, the completion information CP is stored in the completion queue CQ1 of the main memory 12.

As a result of the calculation, when another memory system 20 performs the read operation, the first memory system 20_1 generates the request RQT corresponding to the memory system 20 that performs the read operation. The requests corresponding to the second memory system 20_2 to the n-th memory system 20_n are defined as the second request RQT2 to the n-th request RQTn. For example, when the first memory system 20_1 generates the second request RQT2 and the n-th request RQTn, the second request RQT2 is stored in the submission queue SQ2, and the n-th request is stored in the submission queue SQn. Then, the first memory system 20_1 notifies the doorbell registers of the second memory system 20_2 and the n-th memory system 20_n that the requests RQT2 and RQTn have been stored. Note that the number of requests RQT generated by the first memory system 20_1 may be one or more.

Upon receiving the notification, the memory system 20 acquires the request RQT from the corresponding submission queue SQ of the RAM 308 of the first memory system 20_1 and performs the read operation. For example, when the doorbell registers of the second memory system 20_2 and the n-th memory system 20_n are notified, the second memory system 20_2 acquires the second request RQT2 from the submission queue SQ2 of the RAM 308 and performs the read operation of data DAT2. The n-th memory system 20_n acquires the n-th request RQTn from the submission queue SQn of the RAM 308 and performs the read operation of data DATn.

The memory system 20 that has performed the read operation based on the request RQT generated by the first memory system 20_1 transmits data DAT directly to the main memory 12. After generating completion information CP, the memory system 20 transmits the completion information CP to the first memory system 20_1. For example, when the second memory system 20_2 and the n-th memory system 20_n perform the read operation, the data DAT2 and DATn are transmitted to the main memory 12. The completion information CP generated by the second memory system 20_2 and the completion information CP generated by the n-th memory system 20_n are transmitted to the first memory system 20_1. Then, the completion information CP is stored in each of the completion queues CQ2 and CQn of the RAM 308.

When the completion information CP corresponding to the generated request RQT is stored in the completion queue CQ of the RAM 308, the first memory system 20_1 generates completion information CP corresponding to the first request RQT1. Then, the first memory system 20_1 transmits the generated completion information CP to the completion queue CQ1 of the main memory 12. In the present example, therefore, regardless of the memory system 20 from which the data DAT is read, the first memory system 20_1 which has acquired the first request RQT1 transmits the completion information CP to the completion queue CQ1 of the main memory 12. However, each memory system 20 transmits the read data DAT directly to the main memory 12.

In the present example, the first memory system 20_1 may select a plurality of memory systems 20 and allow each of the memory systems to execute a request RQT. That is, the first memory system 20_1 may transmit the requests RQT to the memory systems 20. When the first memory system 20_1 acquires the completion information CP of each of the memory systems 20 which has executed the request, the first memory system 20_1 generates completion information CP for the first request RQT1 and stores the generated completion information CP in the completion queue CQ1 of the main memory 12.

It should be noted that the request RQT may be stored in the submission queue SQ of RAM308 of the next access destination memory system 20. For example, the second request RQT2 may be stored in the submission queue SQ of RAM308 of the memory system 20_2. The n-th request RQTn may be stored in the submission queue SQ of RAM308 of the n-th memory system 20_n.

2.4 Advantages of Present Embodiment

The configuration according to the present embodiment can be applied to the first embodiment.

With the configurations according to the first and second examples of the present embodiment, the memory system 20 that has completed the request transmits the completion information CP directly to the host device 10. Thus, it possible to shorten latency for transmitting the completion information CP to the host device 10 and decrease the bandwidth of data transmission on the host bus. Furthermore, the process in the memory system 20_1 can be simplified because the memory system 20_1 that has received the request RQT1 from the host device 10 terminates the process at the time of transmitting a request RQT2 to another memory system 20.

With the configuration according to the second example of the present embodiment, the completion information CP is stored in the completion entry CE corresponding to the submission entry SE. Thus, the host CPU 11 can reduce the process of the completion queue CQ.

With the configuration according to the third example, the memory system 20 that has received the request transmits the completion information CP to the host device 10. Thus, the host CPU 11 can process the completion queue CQ as in the case of the single-stage read operation. Since, furthermore, the memory systems 20_1 includes the submission queues SQ and the completion queues CQ, the memory systems 20_1 can issue a plurality of requests RQT to a plurality of memory systems 20 and wait for reception of completion information CP corresponding to each of the requests RQT.

3. Third Embodiment

Next is a description of a third embodiment. The third embodiment is directed to a case where a single-stage read operation and a multistage read operation are not distinguished by a read command. Hereinafter, differences from the first embodiment will be mainly described.

3.1 Flow of Read Operation

Figure 10:
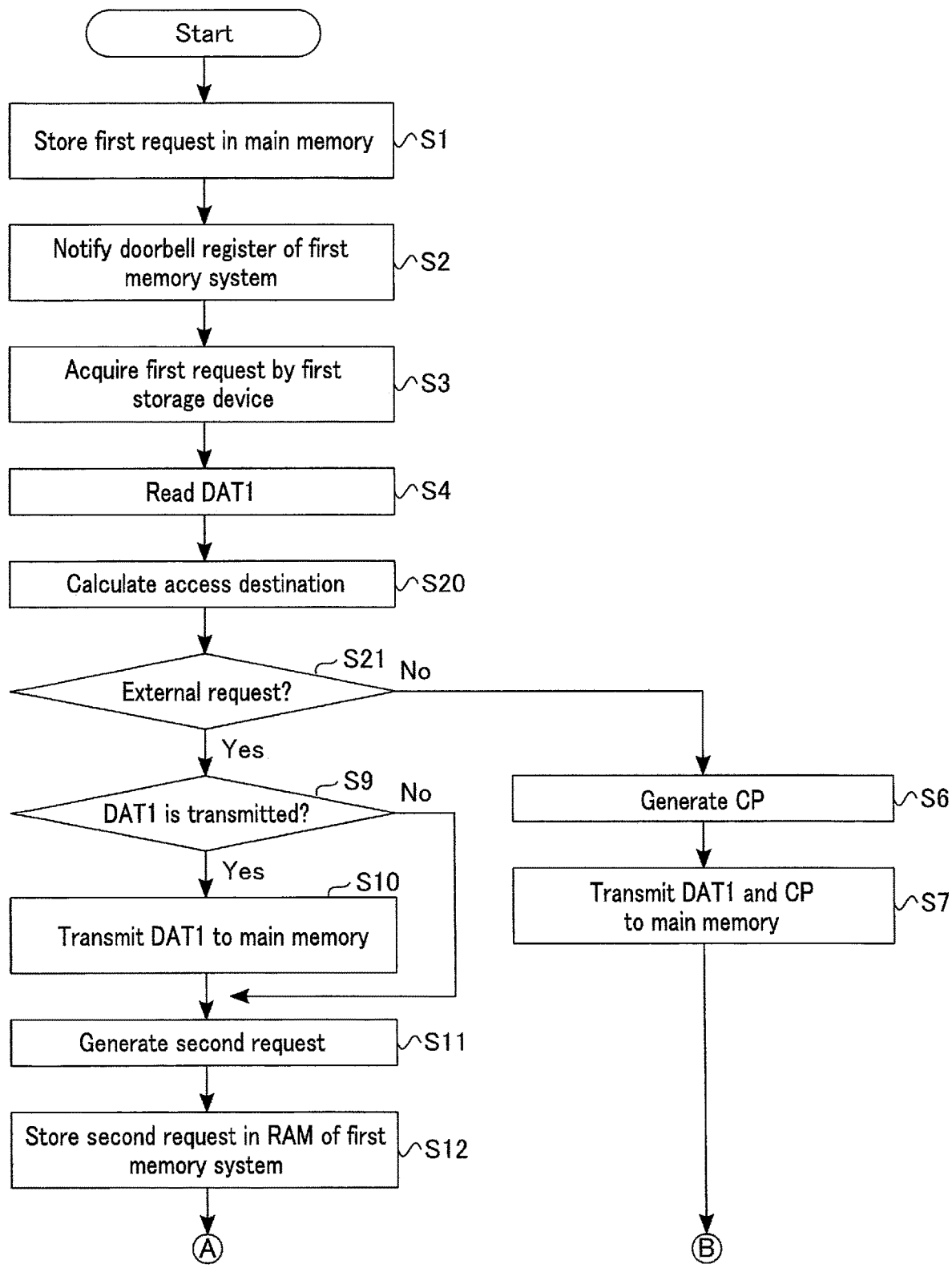
FIG. 10 is a flowchart of read operation in a data processing device according to a third embodiment.
Figure 11:
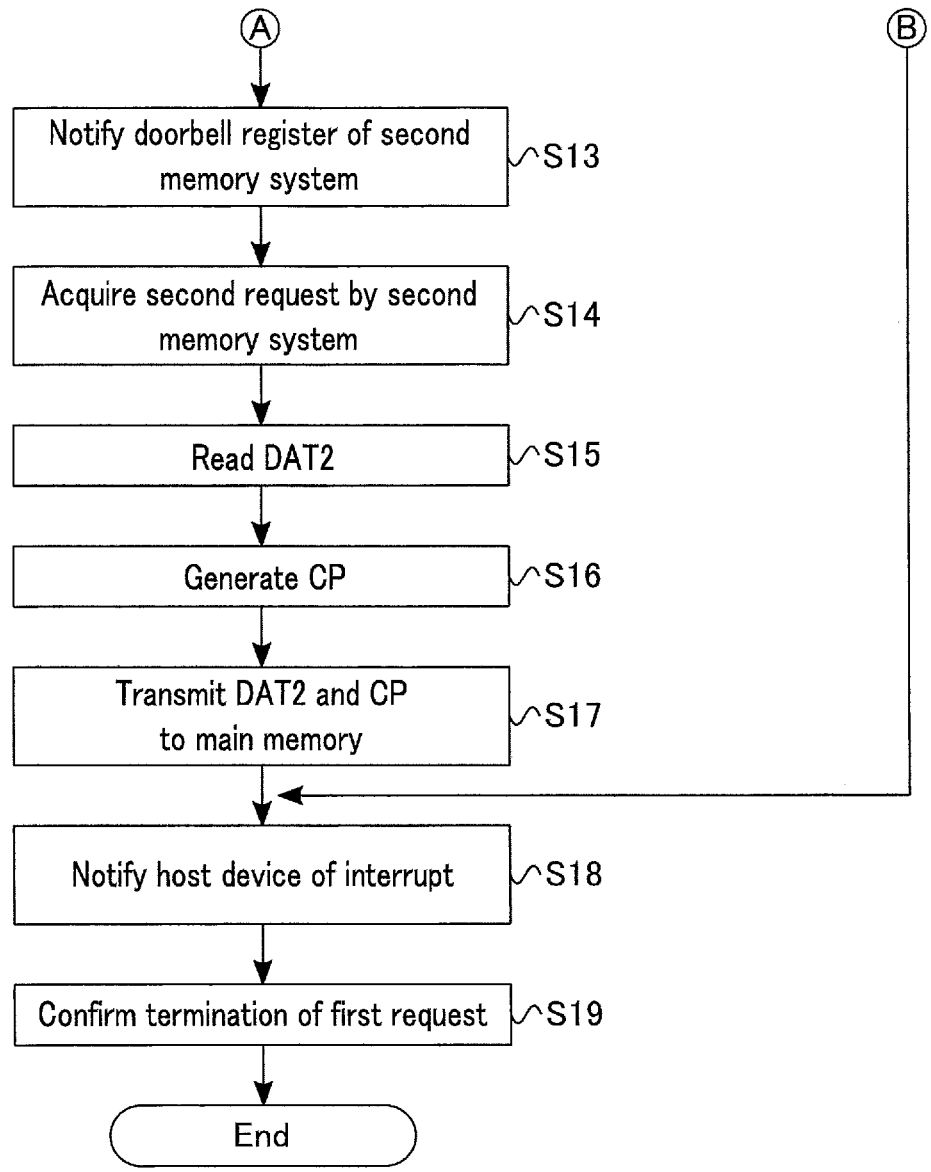
FIG. 11 is a flowchart of read operation in the data processing device according to the third embodiment.

An example of a flow of a read operation will be described with reference to FIGS. 10 and 11. FIGS. 10 and 11 show a flowchart of the read operation. In the example of FIGS. 10 and 11, data DAT2 of the second memory system 20_2 is read out using data DAT1 of the first memory system 20_1.

As shown in FIGS. 10 and 11, the operations of steps S1 to S4 are the same as those of the first embodiment. Note that the read command included in the first request RQT1 of the present embodiment is common to the single-stage read operation and the multistage read operation.

After the data DAT1 is read out, the computing circuit 306 of the first memory system 20_1 computes the next access destination address AAD2 using the data DAT1 (step S20).

As a result of the computation, when no external request is made (No in step S21), that is, in the case of the single-stage read operation, the operations after step S6 transition (steps S6, S7, S18 and S19) are the same as those of the first embodiment.

As a result of the computation, when an external request is made (Yes in step S21), that is, in the case of the multistage read operation, the operations after step S9 (steps S9 to S19) are the same as those of the first embodiment.

3.2 Advantages of Present Embodiment

The configuration according to the present embodiment can bring about the same advantages as those of the first embodiment. Note that the second embodiment may be applied to the third embodiment.

4. Fourth Embodiment

Next is a description of a fourth embodiment. The fourth embodiment is directed to four examples of multistage read operation corresponding to Key-Value-Store (KVS). Hereinafter, differences from the first embodiment will be mainly described.

4.1. First Example

First, a first example will be described. The first example is directed to a case where multistage read operation is performed based on a key (Key). For example, if a B-tree index is divided and stored in a plurality of memory systems 20, a multistage read operation is performed to traverse the B-tree index and to acquire a value (Value) corresponding to a key. Hereinafter, an operation to acquire a value (Value) from an entry specified by a key is referred to as a get operation.

4.1.1 Multistage Read Operation

A multistage read operation of this example will be described with reference to FIG. 12. FIG. 12 is a block diagram showing an example of multistage read operation corresponding to KVS.

As shown in FIG. 12, first, the host device 10 transmits a first request RQT1 to the first memory system 20_1. That is, the first memory system 20_1 acquires the first request RQT1 from the submission queue SQ of the main memory 12. The first request RQT1 includes a command GT instructing get operation and a key. KY(145) in FIG. 12 represents a case where the Key KY is of an integer type 145. The Key KY is not limited to an integer type. Further, the first request RQT1 may include information on a root node to be accessed first in the first memory system 20_1. The information on the root node may be an address of a page from which data is read first, or may be a field to specify which tree (namely, root node) is used.

Based on the first request RQT1, the memory controller 30 of the first memory system 20_1 transmits a read instruction to the nonvolatile memory 40 and reads data DAT1 from the nonvolatile memory 40. The computing circuit 306 compares the read data DAT1 with the Key KY(145), and determines a next page from which information is read. At this time, a read operation can be performed a plurality of times to search for a tree in accordance with a tree-structure of the B-tree index. More specifically, for example, if a node of the tree-structure is searched for in the first memory system 20_1, based on a result of reading information (data) on a node, information on the next node is read. Therefore, if information on the next node is stored in the nonvolatile memory 40 of the first memory system 20_1, an operation of reading information on the next node is repeated.

If it is determined that, for example, information on the next node is stored in the second memory system 20_2, the memory controller 30 generates a second request RQT2 to continue the get operation in the second memory system 20_2. The second request RQT2 includes the command GT and the Key KY(145). The Key KY(145) is access information. The second request RQT2 may include information on the next page as access information. The information on the next page may be an address of a page from which data is read next, may be information on the next node in the B-tree index, or may be information of a pointer indicating the next node. The command GT and the Key KY(145) may be the same as those of the first request RQT1.

The second memory system 20_2 acquires the second request RQT2 from the RAM 308 (submission queue SQ) of the first memory system 20_1. Based on the second request RQT2, the memory controller 30 of the second memory system 20_2 reads data DAT2 as a Value from the entry, namely, the page corresponding to the Key KY(145) of the nonvolatile memory 40. At this time, a read operation can be performed a plurality of times to search for a tree in accordance with a tree-structure of the B-tree index. More specifically, for example, when a node of the tree-structure is searched for in the second memory system 20_2, based on a result of reading information on one node, information on the next node is read. The read operation is repeated, for example, until a Value is acquired.

When the data DAT2 (Value) is acquired, the memory controller 30 of the second memory system 20_2 generates completion information CP. Then, the memory controller 30 of the second memory system 20_2 transmits the data DAT2 and the completion information CP to the host device 10. If it is determined that, for example, information on the next node is stored in another memory system 20, the memory controller 30 can generate a next request RQT.

4.1.2 Specific Example of Get Operation

Figure 13:
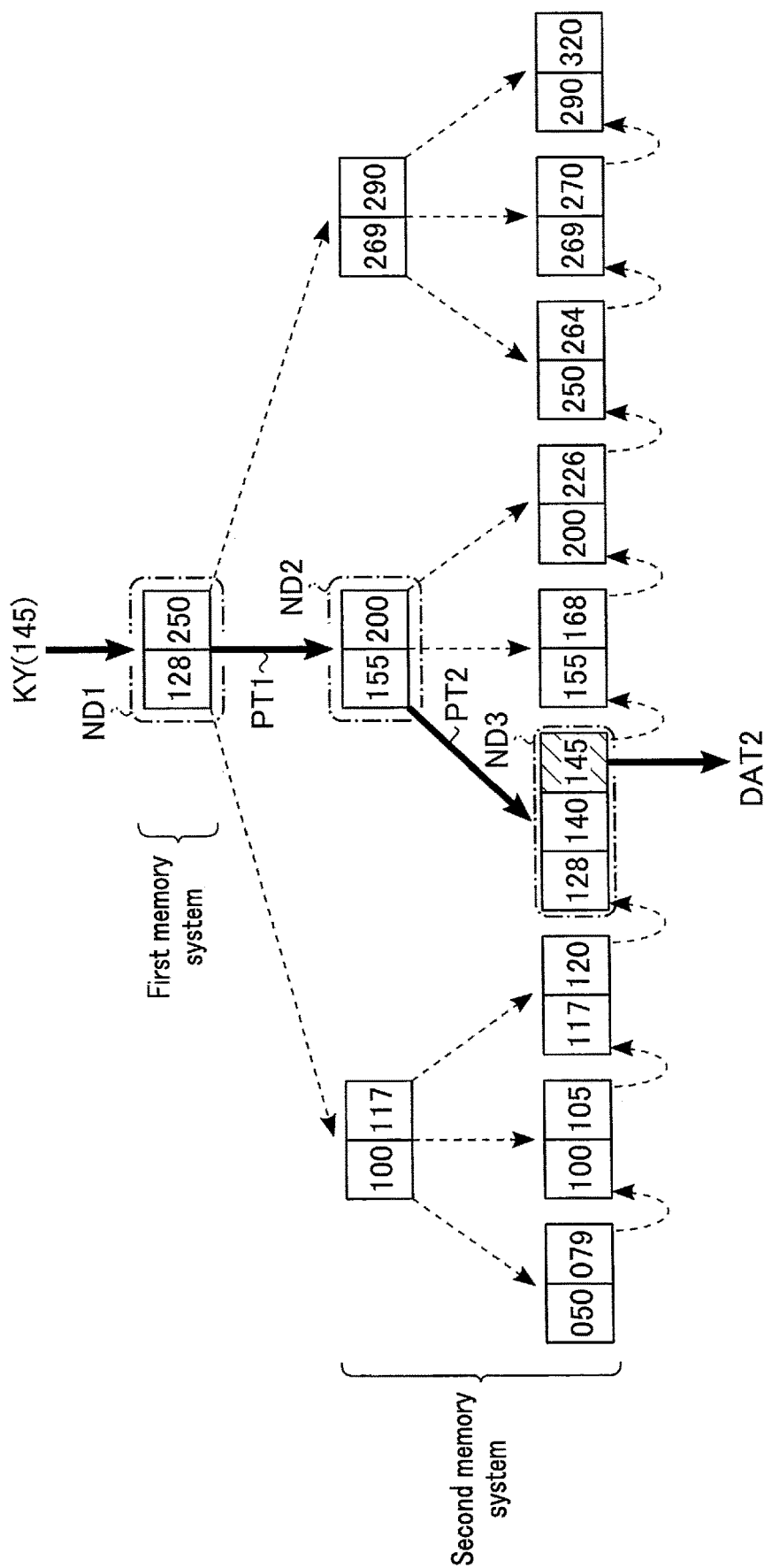
FIG. 13 is a diagram showing an example of get operation corresponding to KVS in the data processing device according to the first example of the fourth embodiment.

Next, a specific example of a get operation will be described. FIG. 13 is a diagram showing an example of the get operation in the B-tree index. FIG. 13 shows an example of a three-level tree structure, in which a node of a first level is stored in the first memory system 20_1, and nodes of a second level and a third level are stored in the second memory system 20_2. The tree structure and its division into SSDs are not limited to this example.

As shown in FIG. 13, first, the first memory system 20_1 acquires the first request RQT1 from the host device 10. The first request RQT1 includes the command GT and the Key KY(145). Next, the memory controller 30 of the first memory system 20_1 reads the data DAT1 as information on a node ND1 from a page corresponding to the node ND1 in the nonvolatile memory 40. The node ND1 of the first level is a root node. The page from which the information on the node ND1 is read may be specified by the first request RQT1 or may be preset in the first memory system 20_1. The computing circuit 306 compares the data DAT1 (information on the node ND1) with the Key KY(145), and selects a pointer PT1, namely, a node of the second level. In other words, the computing circuit 306 determines a next page from which information is read. More specifically, the node ND1 includes, for example, information on two Keys KY(128 and 250). Since the value of the Key KY(145) is greater than that of the Key KY(128) and smaller than that of the Key KY(250), the computing circuit 306 selects the pointer PT1. Thus, the computing circuit 306 determines a node ND2 of the second level corresponding to the pointer PT1.

For example, the information on the node ND1 can include information on a storage location of the information on the node ND2 (in this example, the second memory system 20_2). For example, in which memory system the node ND2 is stored may be directly written in the pointer PT1. The computing circuit 306 can determine that the node ND2 is stored in the memory system 20_2 by reading the pointer PT1. The computing circuit 306 may determine in which memory system 20 the node ND2 is stored, as a result of some computation for the data read as the node ND1 in the computing circuit 306.

If the first memory system 20_1 corresponding to the node ND1 has information on the levels of the tree in advance, it may determine that the node ND2 is stored in the memory system 20_2 from the level of the node ND2. In the example shown in FIG. 13, the first memory system 20_1 may have information that the node of the first level is stored in the nonvolatile memory 40 of the first memory system 20_1 and the nodes of the second and subsequent levels are stored in the nonvolatile memory 40 of the second memory system 20_2. The computing circuit 306 of the first memory system 20_1 can determine that, for example, the information on the node ND2 of the second level is stored in the nonvolatile memory 40 of the second memory system 20_2 based on the information on the levels of the tree.

The computing circuit 306 calculates access information based on the information on the node ND1. The external request generation circuit 307 generates the second request RQT2 to continue the get operation of the Key KY(145) in the second memory system 20_2. The second request RQT2 includes, for example, information on the Key KY(145) and information on the next page (information on the node ND2 or the pointer PT1) as access information.

The second memory system 20_2 acquires the second request RQT2 from the first memory system 20_1. The memory controller 30 of the second memory system 20_2 reads information on the node ND2 from the nonvolatile memory 40. The computing circuit 306 compares the information on the node ND2 with the Key KY(145), and selects a pointer PT2, namely, a node ND3 of the third level. In other words, the computing circuit 306 determines a next page from which information is read. More specifically, the node ND2 includes, for example, two Keys KY(155 and 200). Since the value of the Key KY(145) is smaller than that of the Key KY(155), the computing circuit 306 selects the pointer PT2. Thus, the memory controller 30 selects the node ND3 of the third level corresponding to the pointer PT2.

For example, the information on the node ND2 may include information on a storage location of the information on the node ND3 (in this example, the second memory system 20_2). For example, in which memory system 20 the node ND3 is stored may be directly written in the pointer PT2. The computing circuit 306 can determine that the node ND3 is stored in the memory system 20_2 by reading the pointer PT2. The computing circuit 306 may determine in which memory system 20 the node ND3 is stored, as a result of some computation for the data read as the node ND2 in the computing circuit 306. The information on the node ND3 is stored in the second memory system 20_2. Therefore, the computing circuit 306 requests reading of information on the node ND3 from the nonvolatile memory 40 in the second memory system 20_2. In this example, the node of the third level is a leaf node. The node ND3 includes, for example, three Keys KY(128, 140, and 145). Since the information included in the node ND3 matches the Key KY(145), the memory controller 30 reads data DAT2 from the entry corresponding to the Key KY(145) in the nonvolatile memory 40 as a Value. The memory controller 30 transmits the data DAT2 and the completion information CP to the host device 10. For example, if the node ND3 does not match the Key KY(145), the memory controller 30 reports to the host device 10 that a Value was not found.

In this example, the three-level tree structure has been described. In the case of a four or more-level tree structure, the operation of comparing the read data (information on the node) with the Key KY and determining a next page from which information is read (a node of the next level) is repeated. In the case where Value data is included in a node other than the leaf node in a middle of the tree, if the read data matches the Key KY in the middle of the tree, data (Value) may be read from the entry corresponding to the Key KY.

4.1.3 Advantages of First Example

The configuration according to the present example can bring about the same advantages as those of the first embodiment.

Furthermore, with the configuration of this example, in an operation of tracking pointers in a data structure using pointers, if the data structure is arranged over a plurality of memory systems 20 (SSDs), an operation of tracking a tree structure can be performed without using the host CPU 11. Specifically, in a get operation in the case of an index having a tree structure over a plurality of memory systems 20 (SSDs), the index can be tracked without using the host CPU 11. Therefore, advantages of reducing the processes of the host CPU 11, shortening the latency (time from a start to an end of the process of tracking pointers), and decreasing the bandwidth used by the host bus can be attained.

4.2 Second Example

Next is a description of a second example. The second example is directed to a case where the second request RQT2 includes information on a small tree index. For example, in a tree structure, lower levels can be regarded as a group of a plurality of small tree structures. In this example, a plurality of small tree structures stored in the second memory system 20_2 are defined as small tree indexes TI. Hereinafter, differences from the first example of the fourth embodiment will be mainly described.

4.2.1 Multistage Read Operation

A multistage read operation of this example will be described with reference to FIG. 14. FIG. 14 is a block diagram showing an example of the multistage read operation corresponding to KVS.

As shown in FIG. 14, similarly to the first example of the fourth embodiment, the host device 10 transmits the first request RQT1 to the first memory system 20_1. Based on the first request RQT1, the memory controller 30 of the first memory system 20_1 reads the data DAT1 from the nonvolatile memory 40. The computing circuit 306 compares the read data DAT1 with the Key KY, and determines a small tree index TI. At this time, a read operation can be performed a plurality of times to search for a tree in accordance with a tree-structure of the B-tree index. If it is determined that, for example, information on the next node is stored in the nonvolatile memory 40 of the second memory system 20_2, the memory controller 30 generates the second request RQT2 to continue the get operation in the second memory system 20_2. The second request RQT2 of this example includes the command GT, the Key KY(145), and the small tree index TI. The small tree index TI is access information. TI(1) in FIG. 14 indicates that the small tree index TI number is 1.

The operation in the memory system 20_2 is similar to that of the first example of the fourth embodiment.

4.2.2 Specific Example of Get Operation

Next, a specific example of a get operation will be described. FIG. 15 is a diagram showing an example of the get operation in the B-tree index. FIG. 15 shows an example of a three-level tree structure, in which a node of a first level is stored in the first memory system 20_1, and nodes of a second level and a third level are stored in the second memory system 20_2. The tree structure and its division into SSDs are not limited to this example.

As shown in FIG. 15, in the second memory system 20_2 of this example, a node ND4 of the second level and corresponding nodes in the third level are defined as a small tree index TI(0); a node ND2 of the second level and corresponding nodes in the third level are defined as a small tree index TI(1); and a node ND5 of the second level and corresponding nodes in the third level are defined as a small tree index TI(2).

First, the first memory system 20_1 acquires the first request RQT1 from the host device 10. The first request RQT1 includes the command GT and the Key KY(145). Next, the memory controller 30 of the first memory system 20_1 reads the data DAT1 as information on the node ND1 from the nonvolatile memory 40. The computing circuit 306 compares the data DAT1 (information on the node ND1) with the Key KY(145), and selects a pointer PT1, namely, the small tree index TI(1) of the memory system 20_2. In other words, the computing circuit 306 determines a next page from which information is read. The small tree index TI(1) of the memory system 20_2 may be directly stored in the pointer PT1, or a result of computation of the data of the node ND1 by the computing circuit 306 may be determined as the small tree index TI(1) of the memory system 20_2. The small tree index TI(1) is stored in the nonvolatile memory 40 of the second memory system 20_2. Accordingly, the computing circuit 306 calculates access information based on the information on the node ND1. The external request generation circuit 307 generates the second request RQT2. The second request RQT2 includes, for example, the Key KY(145) and the small tree index TI(1).

The second memory system 20_2 acquires the second request RQT2 from the first memory system 20_1. The memory controller 30 of the second memory system 20_2 reads information on the node ND2 of the small tree index TI(1) from the nonvolatile memory 40. Similarly to the first example of the fourth embodiment, the computing circuit 306 compares the information on the node ND2 with the Key KY(145), and selects the pointer PT2, namely, the node ND3 of the third level. If the node ND3 includes information on the Key KY matching the Key KY(145), the memory controller 30 reads the data DAT2 from the entry corresponding to the Key KY(145) in the nonvolatile memory 40 as a Value. The memory controller 30 transmits the data DAT2 and the completion information CP to the host device 10.

4.2.3 Advantages of Second Example

The configuration according to the present example can bring about the same advantages as those of the first example of the fourth embodiment.

Furthermore, with the configuration of this example, if the second memory system 20_2 has a plurality of trees, it is possible to specify what tree should be searched for. Accord-

4.3 Third Example

Next is a description of a third example. The third example is directed to a case where a range of Keys is specified. Hereinafter, differences from the first and second examples of the fourth embodiment will be mainly described.

4.3.1 Multistage Read Operation

Figure 16:
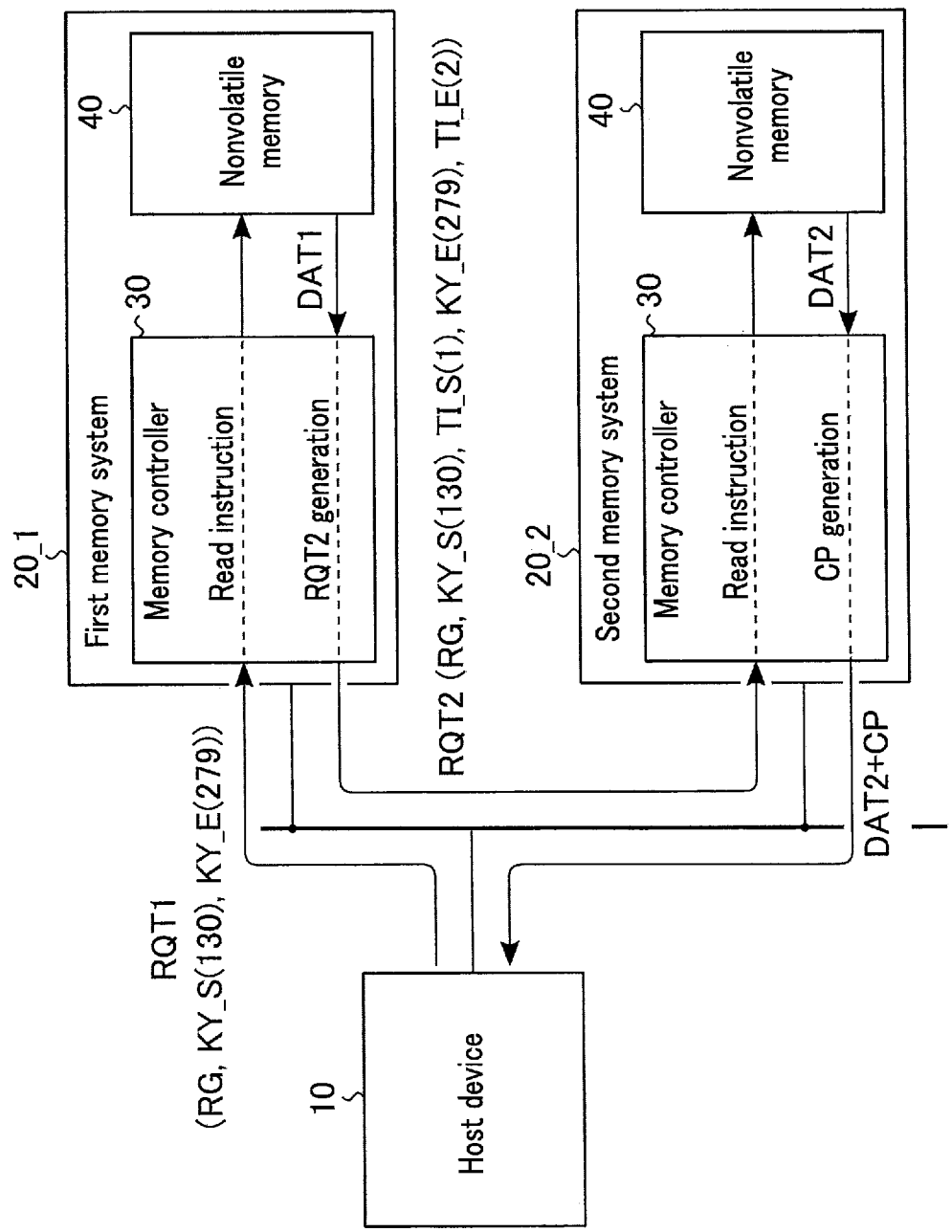
FIG. 16 is a block diagram showing an example of multistage read operation corresponding to KVS in a data processing device according to a third example of the fourth embodiment.

A multistage read operation of this example will be described with reference to FIG. 16. FIG. 16 is a block diagram showing an example of the multistage read operation corresponding to KVS. Hereinafter, an operation to acquire data (Value) from a plurality of entries corresponding to Keys of the specified range is referred to as a range operation.

As shown in FIG. 16, first, the host device 10 transmits a first request RQT1 to the first memory system 20_1. The first request RQT1 includes a command RG instructing a range operation, and a start Key KY_S and an end Key KY_E for specifying the range. KY_S(130) in FIG. 16 represents a case where the Key KY specified by the start Key KY_S is 130. KY_E(279) represents a case where the Key KY specified by the end Key KY_E is 279.

The memory controller 30 of the first memory system 20_1 determines a start small tree index TI_S corresponding to the start Key KY_S(130) and an end small tree index TI_E corresponding to the end Key KY_E(279) in the same procedure as that in the second example of the fourth embodiment. The memory controller 30 may not determine the end small tree index TI_E. If it is determined that the next node is stored in the second memory system 20_2, the memory controller 30 generates the second request RQT2 to continue the range operation in the second memory system 20_2. The second request RQT2 of this example includes the command RG, the start Key KY_S(130), the start small tree index TI_S(1), the end Key KY_E(279), and the end small tree index TI_E(2). The second request RQT2 may not include the end small tree index TI_E(2). The start Key KY_S(130), the start small tree index TI_S(1), the end Key KY_E(279), and the end small tree index TI_E(2) are access information. TI_S(1) in FIG. 16 indicates the start small tree index TI_S number is 1. TI_E(2) indicates that the end small tree index TI_E number is 2.

Based on the second request RQT2, the memory controller 30 of the second memory system 20_2 reads the data DAT2 as a Value from a plurality of entries corresponding to a plurality of Keys KY in the range from the start Key KY_S(130) to the end Key KY_E(279) from the leaf nodes included in the small tree indexes TI in the range from the start small tree index TI_S(1) to the end small tree index TI_E(2). At this time, a read operation can be performed a plurality of times in the nonvolatile memory 40. When the Values (data DAT2) are acquired, the memory controller 30 of the second memory system 20_2 generates completion information CP. Then, the memory controller 30 of the second memory system 20_2 transmits the data DAT2 and the completion information CP to the host device 10.

4.3.2 Specific Example of Range Operation

Next, a specific example of a range operation will be described. FIG. 17 is a diagram showing an example of the range operation in the B-tree index. FIG. 17 shows an example of a three-level tree structure, in which a node of a first level is stored in the first memory system 20_1, and nodes of a second level and a third level are stored in the second memory system 20_2. The tree structure and its division into SSDs are not limited to this example.

As shown in FIG. 17, in the second memory system 20_2 of this example, similarly to the second example of the fourth embodiment, a node ND4 of the second level and corresponding nodes in the third level are defined as a small tree index TI(0), a node ND2 of the second level and corresponding nodes in the third level are defined as a small tree index TI(1), and a node ND5 of the second level and corresponding nodes in the third level are defined as a small tree index TI(2).

First, the first memory system 20_1 acquires the first request RQT1 from the host device 10. The first request RQT1 includes the command RG, the start Key KY_S(130), and the end Key KY_E(279). Next, the memory controller 30 of the first memory system 20_1 reads the data DAT1 as information on the node ND1 from the nonvolatile memory 40. The computing circuit 306 compares the data DAT1 (information on the node ND1) with the start Key KY_S (130), and selects a pointer PT1, namely, the start small tree index TI_S(1). The computing circuit 306 compares the data DAT1 (information on the node ND1) with the end Key KY_E(279), and selects a pointer PT3, namely, the end small tree index TI_E(2). If it is determined that the next node is stored in the second memory system 20_2, the external request generation circuit 307 generates the second request RQT2. The second request RQT2 includes, as access information, for example, the start Key KY_S(130), the start small tree index TI_S(1), the end Key KY_E(279), and the end small tree index TI_E(2).

The second memory system 20_2 acquires the second request RQT2 from the first memory system 20_1. The memory controller 30 of the second memory system 20_2 reads information on the node ND2 of the start small tree index TI_S(1) from the nonvolatile memory 40. The computing circuit 306 compares the information on the node ND2 with the start Key KY_S(130), and selects a pointer PT2, namely, the node ND3 of the third level.

Next, the computing circuit 306 selects Keys KY in a range from the start Key KY_S(130) to the end Key KY_E (279) of the Keys KY included in the third level (leaf nodes) in the start small tree index TI_S(1) and the end small tree index TI_E(2).

More specifically, the memory controller 30 reads information on the node ND3 from the nonvolatile memory 40. The computing circuit 306 selects a key having a value equal to or greater than that of the start Key KY_S(130) and smaller than that of the end Key KY_E(279) from the information on the Keys KY included in the node ND3. In this example, the computing circuit 306 selects the Key KY(140) of the node ND3. Furthermore, the computing circuit 306 selects the Key KY(145) of the node ND3. Since the value of the Key KY(145) that is the greatest in the node ND3 is smaller than the value of the end Key KY_E(279), the computing circuit 306 selects a pointer PT4. The memory controller 30 reads data from the entries corresponding to the Key KY(140) and the Key KY(145) in the nonvolatile memory 40.

Next, the memory controller 30 reads information on a node ND6 indicated by the pointer PT4. The computing circuit 306 selects the Key KY(155) and the Key KY(168) of the node ND6 having values smaller than that of the end Key KY_E(279). Since the value of the Key KY(168) that is the greatest in the node ND6 is smaller than the value of the end Key KY_E(279), the computing circuit 306 selects a pointer PT5. The memory controller 30 reads data from the entries corresponding to the Key KY(155) and the Key KY(168) in the nonvolatile memory 40.

Next, the memory controller 30 reads information on a node ND7 indicated by the pointer PT5. The computing circuit 306 selects the Key KY(200) and the Key KY(226) of the node ND7 having values smaller than that of the end Key KY_E(279). Since the value of the Key KY(226) that is the greatest in the node ND7 is smaller than the value of the end Key KY_E(279), the computing circuit 306 selects a pointer PT6. The memory controller 30 reads data from the entries corresponding to the Key KY(200) and the Key KY(226) in the nonvolatile memory 40.

Next, the memory controller 30 reads information on a node ND8 indicated by the pointer PT6. The computing circuit 306 selects the Key KY(250) and the Key KY(264) of the node ND8 having values smaller than that of the end Key KY_E(279). Since the value of the Key KY(264) that is the greatest in the node ND8 is smaller than the value of the end Key KY_E(279), the computing circuit 306 selects a pointer PT7. The memory controller 30 reads data from the entries corresponding to the Key KY(250) and the Key KY(264) in the nonvolatile memory 40.

Next, the memory controller 30 reads information on a node ND9 indicated by the pointer PT7. The computing circuit 306 selects the Key KY(269) and the Key KY(270) of the node ND9 having values smaller than that of the end Key KY_E(279). Since the value of the Key KY(270) that is the greatest in the node ND9 is smaller than the value of the end Key KY_E(279), the computing circuit 306 selects a pointer PT8. The memory controller 30 reads data from the entries corresponding to the Key KY(269) and the Key KY(270) in the nonvolatile memory 40.

Next, the memory controller 30 reads information on a node ND10 indicated by the pointer PT8. Since the value of the Key KY(290) that is the smallest in the node ND10 is greater than the value of the end Key KY_E(279), the computing circuit 306 terminates the selection of a Key KY. As a result, the data DAT2 corresponding to the Value includes data respectively corresponding to the Key KY(140), the Key KY(145), the Key KY(155), the Key KY(168), the Key KY(200), the Key KY(226), the Key KY(250), the Key KY(264), the Key KY(269), and the Key KY(270). The memory controller 30 transmits the data DAT2 and the completion information CP to the host device 10.

4.3.3 Advantages of Third Example

With the configuration of this example, the index can be tracked without using the host CPU 11 in a range operation. The data processing device 1 can efficiently perform a range operation.

4.4 Fourth Example

Next is a description of a fourth example. The fourth example is directed to a case where the nonvolatile memory 40 of the first memory system 20_1 stores the overall tree structure, and the nonvolatile memory 40 of the second memory system 20_2 stores data corresponding to leaf nodes. Hereinafter, differences from the first to third examples of the fourth embodiment will be mainly described.

4.4.1 Multistage Read Operation

A multistage read operation of this example will be described with reference to FIG. 18. FIG. 18 is a block diagram showing an example of the multistage read operation corresponding to KVS.

As shown in FIG. 18, similarly to the first example of the fourth embodiment, the host device 10 transmits the first request RQT1 to the first memory system 20_1. Based on the first request RQT1, the memory controller 30 of the first memory system 20_1 reads the data DAT1 from the nonvolatile memory 40. The computing circuit 306 compares the read data DAT1 with the Key KY, and calculates an access destination address AAD2 of the second memory system 20_2. At this time, a read operation can be performed a plurality of times to search for a tree in accordance with a tree-structure of the B-tree index. In other words, the memory controller 30 repeatedly performs a search operation from the root node to a Key KY in the first memory system 20_1. If it is determined that the data corresponding to the Key KY(145) is stored in the nonvolatile memory 40 of the second memory system 20_2, the memory controller 30 generates the second request RQT2 to acquire a Value in the second memory system 20_2. The second request RQT2 of this example includes, as access information, an access destination address AAD2 corresponding to the Key KY(145). For example, if the Key KY(145) was not found, the memory controller 30 reports to the host device 10 that no Value was found without generating the second request RQT2.

The second memory system 20_2 acquires the second request RQT2 from the first memory system 20_1. The memory controller 30 of the second memory system 20_2 reads data DAT2 corresponding to the access destination address AAD2 as a Value from the nonvolatile memory 40. The memory controller 30 transmits the data DAT2 and the completion information CP to the host device 10.

4.4.2 Specific Example of Get Operation

Figure 19:
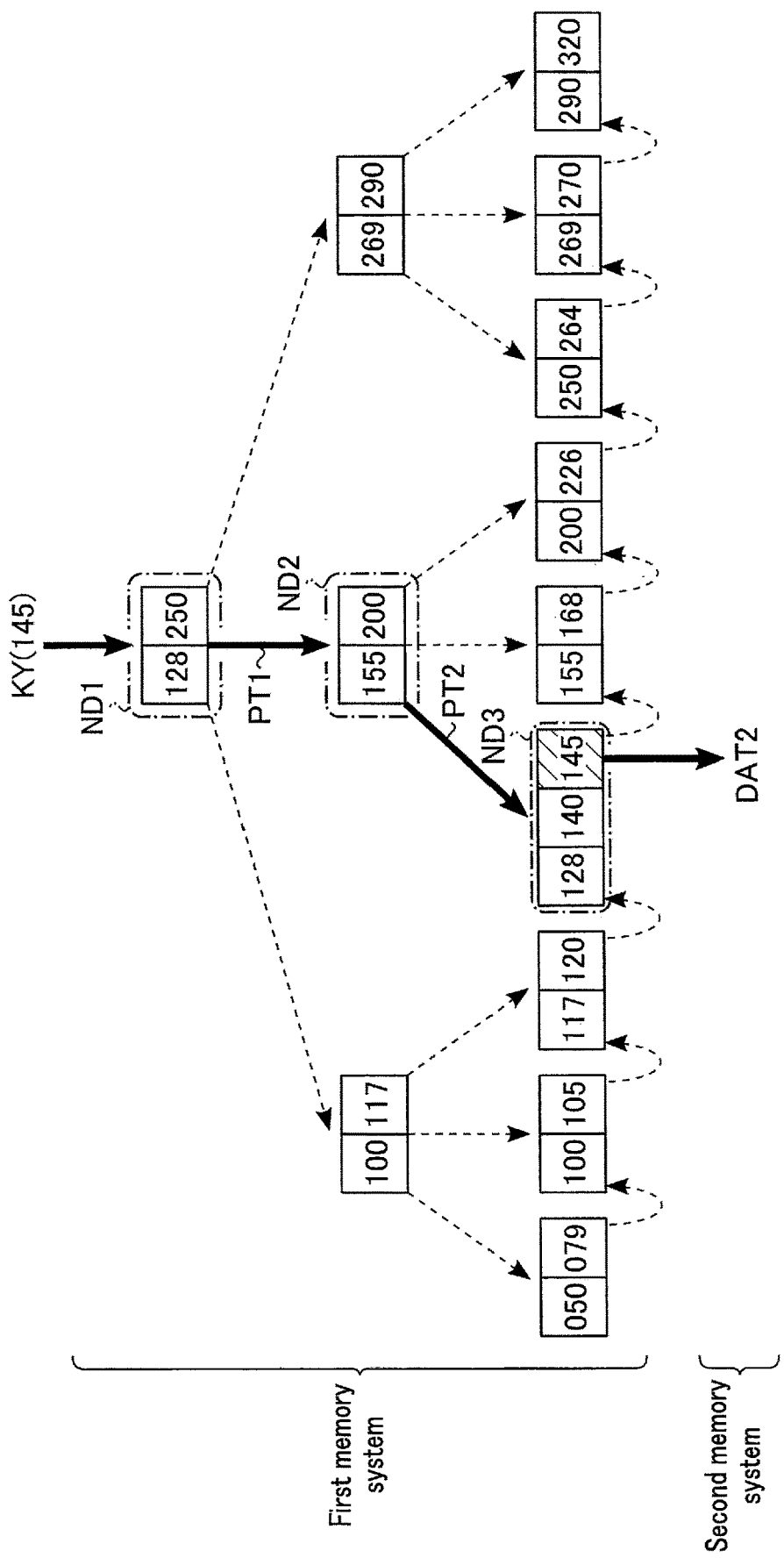
FIG. 19 is a diagram showing an example of range operation corresponding to KVS in the data processing device according to the fourth example of the fourth embodiment.

Next, a specific example of a get operation will be described. FIG. 19 is a diagram showing an example of the get operation in the B-tree index. FIG. 19 shows an example of a three-level tree structure, in which nodes of first to third levels are stored in the first memory system 20_1, and data corresponding to the nodes of the third level are stored in the second memory system 20_2. The tree structure and its division into SSDs are not limited to this example.

As shown in FIG. 19, in this example, search operations to the Key KY(145) in the third level described above as the first example of the fourth embodiment are performed in the first memory system 20_1. Data corresponding to the Key KY(145) is stored in the nonvolatile memory 40 of the second memory system 20_2. The computing circuit 306 can determine this matter upon reading the node ND3 to read the entry data corresponding to the Key KY(145). Alternatively, the first memory system 20_1 may be given information that "the second memory system 20_2 stores data corresponding to the leaf nodes". Thus, the computing circuit 306 can determine that the data is stored in the memory system 20_2. Accordingly, the computing circuit 306 calculates access destination address AAD2 corresponding to the Key KY(145). The external request generation circuit 307 generates the second request RQT2 to acquire the Value in the second memory system 20_2.

The second memory system 20_2 acquires the second request RQT2 from the first memory system 20_1. The memory controller 30 of the second memory system 20_2 reads the data DAT2 as a Value of the Key KY(145) from the access destination address AAD2 in the nonvolatile memory 40. The memory controller 30 transmits the data DAT2 and the completion information CP to the host device 10.

4.4.3 Advantages of Fourth Example

The configuration according to the present example can bring about the same advantages as those of the first example of the fourth embodiment.

Furthermore, with the configuration of this example, even if a Value is included in a page different from the index, the Value can be acquired without using the host CPU 11.

The present embodiment is applied to not only the B-tree index described above, but also a similar case of reading a plurality of memory systems when handling a data structure, such as a tree structure or a list structure, in an operation of tracking pointers in the read data so as to determine a next destination to read.

5. Modification, Etc.

According to the above embodiment, a data processing device includes: a first memory system (20_1) including a first nonvolatile memory (40); a second memory system (20_2) including a second nonvolatile memory (40); and a host device (10) configured to control the first memory system and the second memory system. The first memory system further includes: a first circuit (303) configured to cause the first nonvolatile memory to perform a read operation of first data (DAT1) based on a first request (RQT1) received from the host device; a second circuit (306) capable of calculating a first access information (ADD2) corresponding to the second memory system based on the first data; and a third circuit (307) configured to generate a second request (RQT2) to cause the second memory system to perform a read operation of second data (DAT2) based on the first access information.

The foregoing embodiments can provide a data processing device capable of improving the throughput.

Note that the embodiments are not limited to the above-described ones, but various modifications can be made.

While the embodiments of the present invention have been described, the present invention is not limited to the embodiments, but various modifications can be made without departing from the spirit or scope of the invention. Furthermore, the embodiments include inventions in various stages, and various inventions can be extracted by combining the disclosed structural elements appropriately. For example, even though some of the structural elements are deleted, they can be extracted as an invention if they can bring about a predetermined advantage.

What is claimed is:

1. A data processing device comprising:
a first memory system including a first nonvolatile memory;
a second memory system including a second nonvolatile memory; and
a host device configured to control the first memory system and the second memory system,
wherein
the first memory system further includes:
a first circuit configured to cause the first nonvolatile memory to perform a read operation of first data from the first nonvolatile memory based on a first request received from the host device;
a second circuit capable of calculating a first access information corresponding to the second memory system based on the first data; and
a third circuit configured to generate a second request to cause the second memory system to perform a read operation of second data from the second nonvolatile memory based on the first access information,
the second memory system is configured to transmit the second data to the host device without using the first memory system,
the first request includes a first address of the host device,
the second circuit is configured to calculate a second address as an output destination address of the host device based on the first address, and
the second request includes the second address.

2. The data processing device according to claim 1, wherein the second request includes an identification number of the first request.

3. The data processing device according to claim 1, wherein the second request includes the first access information.

4. The data processing device according to claim 1, wherein
the host device includes a first memory,
the first memory includes a first completion queue corresponding to the first memory system and a second completion queue corresponding to the second memory system, and
the second memory system is configured to generate first completion information corresponding to the second request and transmit the first completion information to the second completion queue.

5. The data processing device according to claim 1, wherein
the host device includes a first memory,
the first memory includes a submission entry corresponding to the first request and a completion entry corresponding to the submission entry, and
the second memory system is configured to generate first completion information corresponding to the second request and transmit the first completion information to the completion entry.

6. The data processing device according to claim 1, wherein
the second memory system is configured to generate first completion information corresponding to the second request and transmit the first completion information to the first memory system, and
the first memory system is configured to generate second completion information corresponding to the first request based on the first completion information, and transmit the second completion information to the host device.

7. The data processing device according to claim 1, wherein the first access information includes an address of the second nonvolatile memory.

8. The data processing device according to claim 1, wherein when the first request includes a key, the first access information includes the key.

9. The data processing device according to claim 1, wherein the second circuit is configured to determine the read operation of the second data to be performed by the second memory system based on at least one of the first data and the first request, and calculate a data size of the second data.

10. The data processing device according to claim 1, wherein the first memory system further includes a fourth circuit configured to generate first completion information when the second request is not generated.

11. The data processing device according to claim 1, wherein the first memory system further includes a second memory including a first submission queue corresponding to the second request.

12. The data processing device according to claim 11, wherein upon receiving a notification about the second request from the first memory system, the second memory system is configured to acquire the second request from the second memory.

13. The data processing device according to claim 1, wherein the second memory system further includes a second memory including a first submission queue corresponding to the second request.

14. The data processing device according to claim 1, wherein the first memory system is a solid state drive (SSD).

15. A data processing device, comprising:
a first memory system including a first nonvolatile memory;
a second memory system including a second nonvolatile memory;
a third memory system including a third nonvolatile memory; and
a host device configured to control the first memory system and the second memory system,
wherein
the first memory system further includes:
a first circuit configured to cause the first nonvolatile memory to perform a read operation of first data from the first nonvolatile memory based on a first request received from the host device;
a second circuit capable of calculating a first access information corresponding to the second memory system based on the first data; and
a third circuit configured to generate a second request to cause the second memory system to perform a read operation of second data from the second nonvolatile memory based on the first access information,
the second memory system is configured to transmit the second data to the host device without using the first memory system,
the second circuit of the first memory system is capable of calculating the first access information and a second access information corresponding to the third memory system based on the first data,
the third circuit of the first memory system is capable of generating the second request based on the first access information and a third request that causes the third memory system to perform a read operation of third data based on the second access information,
the second memory system is configured to generate first completion information corresponding to the second request and transmit the first completion information to the first memory system,
the third memory system is configured to generate second completion information corresponding to the third request and transmit the second completion information to the first memory system, and
the first memory system is configured to generate third completion information corresponding to the first request based on the first completion information and the second completion information, and transmit the third completion information to the host device.

16. The data processing device according to claim 15, wherein the third memory system is configured to transmit the third data to the host device without using the first memory system.

17. The data processing device according to claim 15, wherein the first memory system further includes a second memory including a first submission queue corresponding to the second request, a second submission queue corresponding to the third request, a first completion queue corresponding to the first completion information, and a second completion queue corresponding to the second completion information.

18. The data processing device according to claim 15, wherein
the first memory system further includes a second memory including a first completion queue corresponding to the first completion information and a second completion queue corresponding to the second completion information, and
the second memory system further includes a third memory including a first submission queue corresponding to the second request, and
the third memory system further includes a fourth memory including a second submission queue corresponding to the third request.

* * * * *